US010277810B2

(12) United States Patent
Yaguchi

(10) Patent No.: US 10,277,810 B2
(45) Date of Patent: Apr. 30, 2019

(54) IMAGE PROCESSING APPARATUS THAT DIVIDES AND PROCESSES AN IMAGE SIGNAL, CONTROL METHOD THEREOF, AND STORAGE MEDIUM

(71) Applicant: CANON KABUSHIKI KAISHA, Tokyo (JP)

(72) Inventor: Hiroyuki Yaguchi, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/677,107

(22) Filed: Aug. 15, 2017

(65) Prior Publication Data

US 2018/0054566 A1 Feb. 22, 2018

(30) Foreign Application Priority Data

Aug. 16, 2016 (JP) .................................. 2016-159681

(51) Int. Cl.
*H04N 5/232* (2006.01)
*G06T 1/20* (2006.01)
*H04N 5/14* (2006.01)
*H04N 5/3745* (2011.01)
(Continued)

(52) U.S. Cl.
CPC ........... *H04N 5/23229* (2013.01); *G06T 1/20* (2013.01); *H04N 5/144* (2013.01); *H04N 5/37455* (2013.01); *H04N 19/436* (2014.11); *H04N 19/82* (2014.11); *G06T 2210/00* (2013.01); *G06T 2210/52* (2013.01)

(58) Field of Classification Search
CPC ............... H04N 5/144; H04N 5/23229; H04N 5/37455; G06T 1/0007; G06T 1/20; G06T 1/60; G06T 2210/00; G06T 2210/52
See application file for complete search history.

(56) References Cited

U.S. PATENT DOCUMENTS 8,212,831 B1 * 7/2012 Diard .................. G06T 1/60
345/543
8,854,488 B2 * 10/2014 Shiomi .................. H04N 5/232
348/222.1

(Continued)

FOREIGN PATENT DOCUMENTS

JP 2016-010112 A 1/2016

*Primary Examiner* — Lin Ye
*Assistant Examiner* — Chriss S Yoder, III
(74) *Attorney, Agent, or Firm* — Carter, Deluca & Farrell LLP

(57) ABSTRACT

An image processing apparatus comprises: a first processing circuit which carries out image processing on a first image signal obtained from image signals forming a single image; a second processing circuit which carries out the image processing on a second image signal obtained from the image signals forming the image; and a control circuit which controls communication of image signals between the first processing circuit and the second processing circuit, wherein the first image signal and the second image signal do not have overlap region; and wherein the control circuit controls the communication for transferring an image signal of a region of the image additionally required when the first processing circuit carries out the image processing on the first image signal from the second processing circuit to the first processing circuit.

14 Claims, 14 Drawing Sheets

(51) Int. Cl.
*H04N 19/82* (2014.01)
*H04N 19/436* (2014.01)

(56) References Cited

U.S. PATENT DOCUMENTS

| | | | |
|---|---|---|---|
| 2007/0041448 A1* | 2/2007 | Miller | H04N 19/61 |
| | | | 375/240.18 |
| 2015/0379675 A1* | 12/2015 | Yonemoto | G06T 1/20 |
| | | | 382/307 |
| 2017/0332028 A1 | 11/2017 | Uekusa et al. | |

* cited by examiner

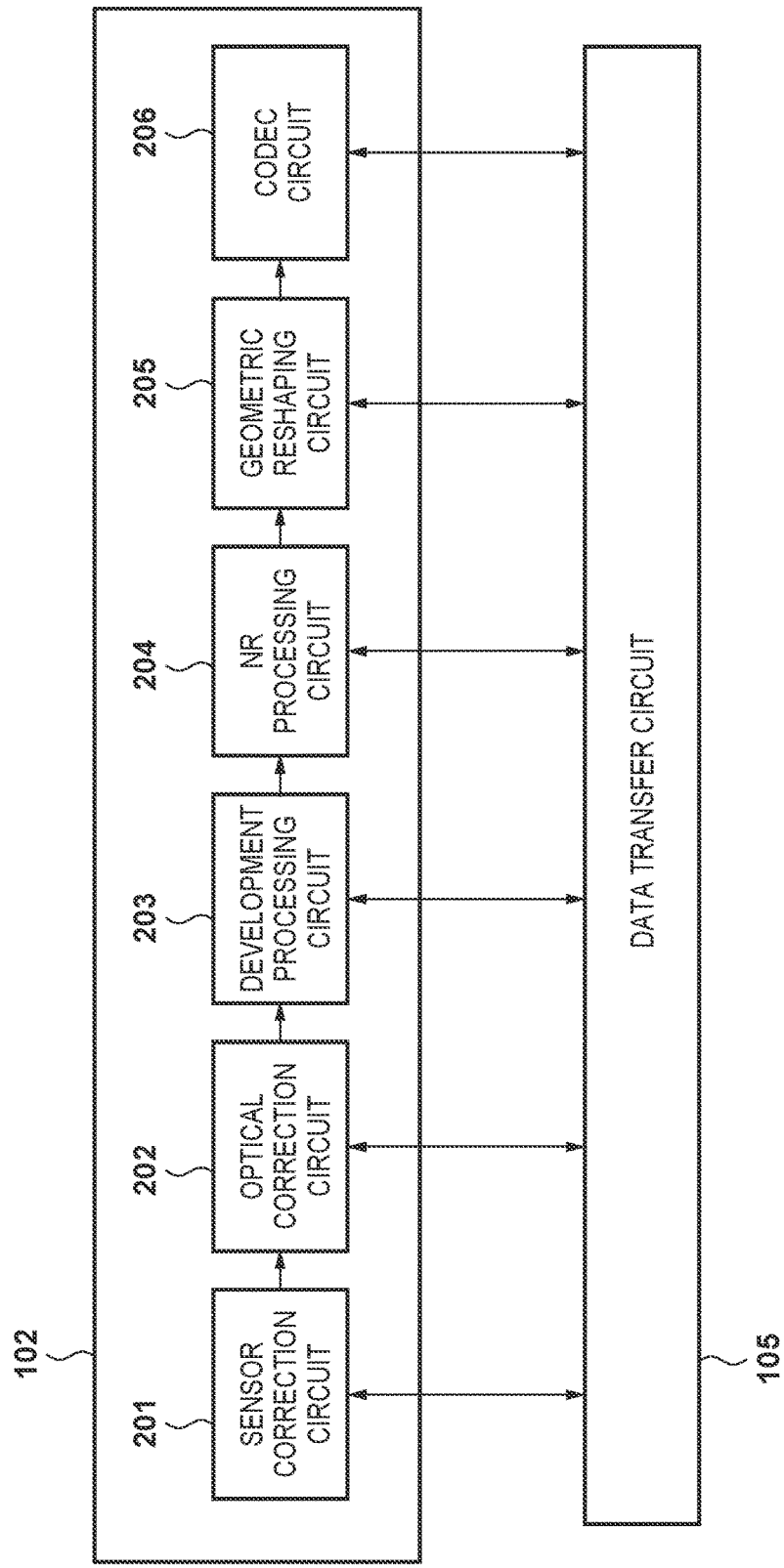

FIG. 4

| f(-4,4) | f(-3,4) | f(-2,4) | f(-1,4) | f(0,4) | f(1,4) | f(2,4) | f(3,4) | f(4,4) |
|---|---|---|---|---|---|---|---|---|
| f(-4,3) | f(-3,3) | f(-2,3) | f(-1,3) | f(0,3) | f(1,3) | f(2,3) | f(3,3) | f(4,3) |
| f(-4,2) | f(-3,2) | f(-2,2) | f(-1,2) | f(0,2) | f(1,2) | f(2,2) | f(3,2) | f(4,2) |
| f(-4,1) | f(-3,1) | f(-2,1) | f(-1,1) | f(0,1) | f(1,1) | f(2,1) | f(3,1) | f(4,1) |
| f(-4,0) | f(-3,0) | f(-2,0) | f(-1,0) | f(0,0) | f(1,0) | f(2,0) | f(3,0) | f(4,0) |
| f(-4,-1) | f(-3,-1) | f(-2,-1) | f(-1,-1) | f(0,-1) | f(1,-1) | f(2,-1) | f(3,-1) | f(4,-1) |
| f(-4,-2) | f(-3,-2) | f(-2,-2) | f(-1,-2) | f(0,-2) | f(1,-2) | f(2,-2) | f(3,-2) | f(4,-2) |
| f(-4,-3) | f(-3,-3) | f(-2,-3) | f(-1,-3) | f(0,-3) | f(1,-3) | f(2,-3) | f(3,-3) | f(4,-3) |
| f(-4,-4) | f(-3,-4) | f(-2,-4) | f(-1,-4) | f(0,-4) | f(1,-4) | f(2,-4) | f(3,-4) | f(4,-4) |

IMAGE PROCESSING APPARATUS THAT DIVIDES AND PROCESSES AN IMAGE SIGNAL, CONTROL METHOD THEREOF, AND STORAGE MEDIUM

BACKGROUND OF THE INVENTION

Field of the Invention

The present invention relates to an image processing apparatus that divides and processes an image signal, a control method thereof, and a storage medium.

Description of the Related Art

In recent image capturing apparatuses such as digital cameras, more pixels in image sensors and high framerates in moving pictures have led to increases in the amounts of data in image signals output from the image sensors. This in turn has led to an increase in the amount of processing carried out by image processors that process the image signals.

An increase in the data amount may mean that a single image processor lacks sufficient processing capabilities. Accordingly, a technique for operating a plurality of image processors in parallel to distribute the load amongst the image processors is known (see Japanese Patent Laid-Open No. 2016-10112). Japanese Patent Laid-Open No. 2016-10112 discloses a technique in which, in a plurality of image processors connected to each other, a processing percentage is determined in accordance with division control information indicating an internal temperature of each processor, a data transfer rate of an internal bus, and so on. Data divided according to that percentage is then processed by the respective processors.

Incidentally, in the case where image signals obtained by dividing an image into top and bottom parts are each subjected to a filtering process or the like by separate processors, to process the vicinity of the division boundary, data from regions passing the boundary (the other area obtained by the division) may be necessary. With respect to this point, Japanese Patent Laid-Open No. 2016-10112 does not take into account how to handle the division of data in a region that passes a boundary (for example, data required by both of two processors). When dividing data for each of the processors, it is conceivable to take into account the data, required by each of the processors, that passes the boundary, and divide the data such that an extra region is provided. However, the greater the data amount becomes, the greater the data amount of the extra region will become as well, causing the processors to take more time for processing and consume more power. What is needed, therefore, is a technique for reducing the amount of data processed by each image processor when the processing of a single image is divided among a plurality of image processors (processing units).

SUMMARY OF THE INVENTION

The present invention has been made in consideration of the aforementioned problems, and realizes a technique that enables an amount of data input into processing units to be reduced in the case where the processing of a single image is divided among a plurality of processing units.

In order to solve the aforementioned problems, one aspect of the present invention provides an image processing apparatus comprising: a first processing circuit which carries out image processing on a first image signal obtained from image signals forming a single image; a second processing circuit which carries out the image processing on a second image signal obtained from the image signals forming the image; and a control circuit which controls communication of image signals between the first processing circuit and the second processing circuit in accordance with progress of the image processing carried out by the first processing circuit and the second processing circuit, wherein the first image signal and the second image signal are image signals obtained by dividing the image into regions such that the regions of the image do not overlap; and wherein the control circuit controls the communication such that an image signal of a region of the image additionally required when the first processing circuit carries out the image processing on the first image signal is transferred from the second processing circuit to the first processing circuit.

Another aspect of the present invention provides a control method of an image processing apparatus comprising a first processing circuit, a second processing circuit, and a processor, the method comprising: carrying out, by the first processing circuit, image processing on a first image signal obtained from image signals forming a single image; carrying out, by the second processing circuit, the image processing on a second image signal obtained from the image signals forming the image; and controlling, by the processor, communication of image signals between the first processing circuit and the second processing circuit in accordance with progress of the image processing performed by the first processing circuit and the second processing circuit, wherein the first image signal and the second image signal are image signals obtained by dividing the image into regions such that the regions of the image do not overlap; and wherein in the controlling, the communication is controlled such that an image signal of a region of the image additionally required in the step of the first image processing circuit carrying out the image processing on the first image signal is transferred from the image signal obtained in the step of the second image processing circuit carrying out the image processing.

Still another aspect of the present invention provides a non-transitory computer-readable storage medium storing a computer program, for causing a computer to function as an image processing apparatus comprising a first processing circuit, a second processing circuit, and a processor, the computer program comprising: a code to cause the first processing circuit to carry out image processing on a first image signal obtained from image signals forming a single image; a code to cause the second processing circuit to carry out image processing on a second image signal obtained from the image signals forming the image; and a code to cause the processor to carry out control of communication of image signals between the first processing circuit and the second processing circuit in accordance with progress of the image processing performed by the first processing circuit and the second processing circuit, wherein the first image signal and the second image signal are image signals obtained by dividing the image into regions such that the regions of the image do not overlap; and wherein the code to cause the processor to carry out controls the communication such that an image signal of a region of the image additionally required for the first image processing circuit to carry out the image processing on the first image signal is transferred from the image signal obtained by the code causing the second image processing circuit to carry out the image processing.

According to the present invention, an amount of data input into processing units can be reduced in the case where the processing of a single image is divided among a plurality of processing units.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a block diagram illustrating an example of the functional configuration of an image processing circuit according to the first embodiment.

FIG. 4 is a diagram illustrating an example of filter coefficients used in a filtering process executed by a sensor correction circuit according to the first embodiment.

DESCRIPTION OF THE EMBODIMENTS

First Embodiment

Hereinafter, exemplary embodiments will be described in detail with reference to the drawings. Hereinafter, a given digital camera capable of processing divided image data using a plurality of processing circuits will be described as an example of the image processing apparatus. However, the present embodiment is not limited to a digital camera, and can be applied in any device capable of processing divided image data using a plurality of processing circuits. Personal computers, cellular phones including smartphones, game consoles, tablet terminals, clock- and eyeglass-type information terminals, medical devices, devices in surveillance systems and vehicle-installed systems, server devices operating in data centers, and so on can be given as examples of such a device. Furthermore, although the following describes an example of dividing the processing of divided image data among a plurality of image processors, the present invention may be applied in the case where the processing of image data is divided among a plurality of devices or a plurality of virtual machines.

Configuration of Digital Camera 150

Figure 1:
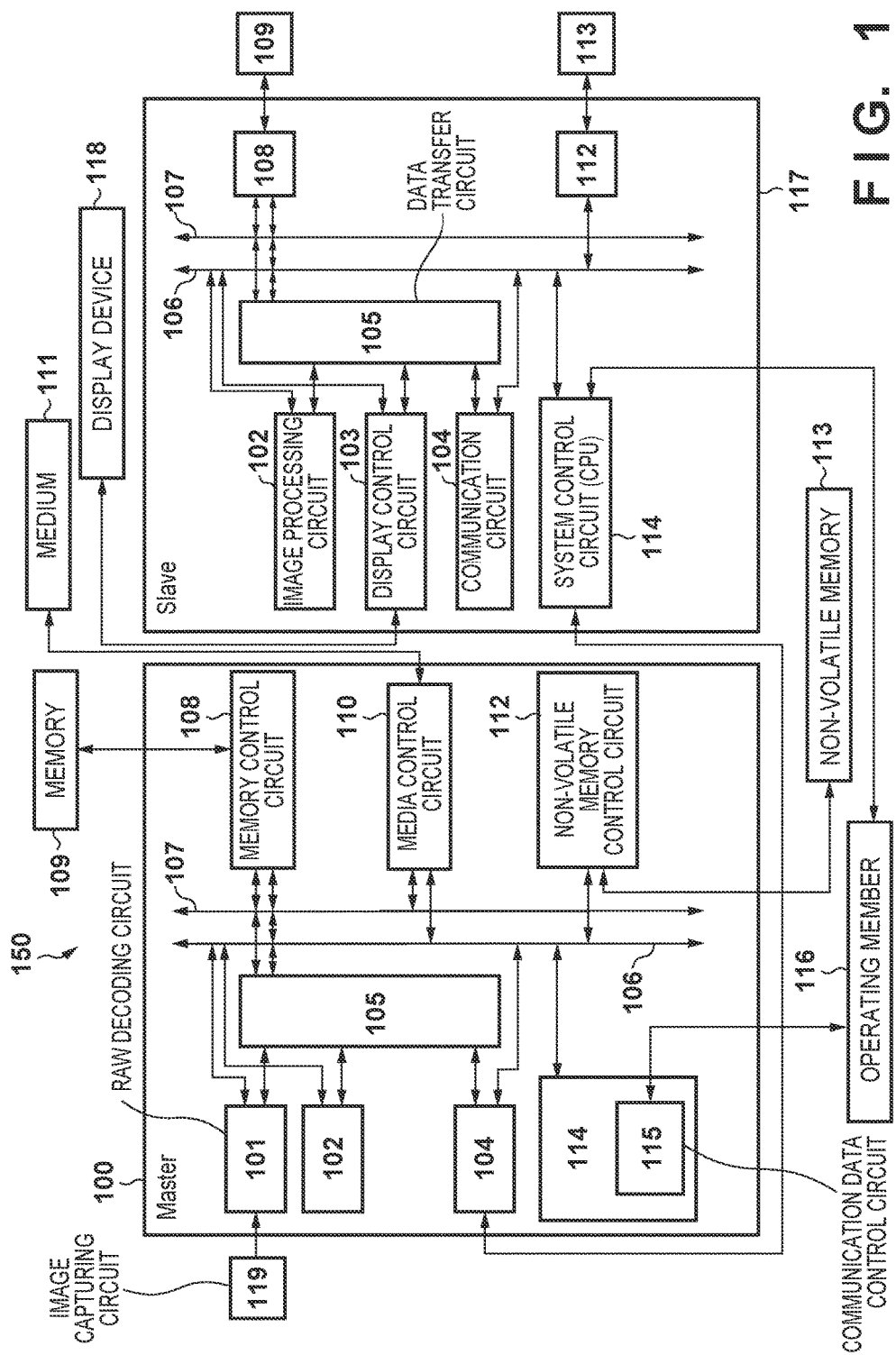
FIG. 1 is a block diagram illustrating an example of the functional configuration of a digital camera serving as an example of an image processing apparatus according to a first embodiment.

An example of the functional configuration of a digital camera 150 according to the present embodiment will be described with reference to FIG. 1. The digital camera 150 includes a master-side image processor 100 and a slave-side image processor 117, both of which are image processors. Note that blocks that are the same in the master-side image processor 100 and the slave-side image processor 117 will be given the same reference numerals, and redundant descriptions thereof will be omitted. In the example illustrated in FIG. 1, the master-side image processor 100 and the slave-side image processor 117 have different constituent elements, but these processors may have the same configurations.

A RAW decoding circuit 101 carries out a process for decompressing compressed RAW data stored in a medium 111. "RAW data" is R, G, and B Bayer-array data obtained by AD-converting image signals (image data), forming a single image, output from an image sensor of an image capturing circuit 119, which will be described later. An image processing circuit 102 carries out image processing, which will be described later, on input image data. The functional configuration, processing details, and so on of the image processing circuit 102 will be described in detail later.

A display control circuit 103 displays image data stored in a memory 109, display images such as an operation menu, and so on in a display device 118 in response to instructions from a system control circuit 114. The display device 118 includes a display panel constituted of an LCD, an OLED device, or the like, and displays captured images, an operation menu for operating the digital camera 150, and so on. The display device 118 may have a touch panel included in an operating member, which will be described later, provided on the display panel.

A communication circuit 104 transmits image data stored in the memory 109 to one of the image processors or receives image data transmitted from one of the image processors. A data transfer circuit 105 is constituted of a plurality of Direct Memory Access Controllers (DMACs) for transferring data, that is, reading and writing data to and from, the memory 109 and the medium 111.

A system bus 106 connects the system control circuit 114, the RAW decoding circuit 101, the image processing circuit 102, the display control circuit 103, the communication circuit 104, the data transfer circuit 105, a memory control circuit 108, a media control circuit 110, and a non-volatile memory control circuit 112. The primary application is as a bus used when controlling the respective processing blocks from the system control circuit 114.

A data bus 107 connects the data transfer circuit 105, the memory control circuit 108, and the media control circuit 110. The primary application is as a bus used when reading and writing image data and the like.

The memory control circuit 108 writes data into the memory 109, reads data out from the memory 109, and so on in response to instructions from the system control circuit 114 or the data transfer circuit 105. The memory 109 is constituted of a DRAM, for example, and has a storage capacity sufficient for storing data such as a predetermined number of still images and a predetermined length of moving pictures and audio, variables and the like used for operations of the system control circuit 114, and so on. Although FIG. 1 illustrates an example in which the master-side image processor 100 and the slave-side image processor 117 are each connected to a corresponding memory 109, the configuration may be such that the processors use a single shared memory.

The media control circuit 110 writes data into the medium 111, reads data out from the medium 111, and so on in response to instructions from the system control circuit 114. The medium 111 includes a storage medium such as a semiconductor memory, and stores compressed still images, moving picture data, and so on.

The non-volatile memory control circuit 112 writes data into a non-volatile memory 113, reads data out from the non-volatile memory 113, and so on in response to instructions from the system control circuit 114. The non-volatile memory 113 includes an electrically erasable/recordable memory such as an EEPROM, and stores programs executed by the system control circuit 114 for controlling the digital camera 150, operating constants of the system control circuit 114, and so on. Although FIG. 1 illustrates an example in which the master-side image processor 100 and the slave-side image processor 117 are each connected to a corresponding non-volatile memory 113, the configuration may be such that the processors use a single shared non-volatile memory.

The system control circuit 114 includes a computation circuit such as a CPU, and controls the operations of the digital camera 150 as a whole by issuing various instructions, executing various control processes, and so on for the function blocks constituting the digital camera 150, the master-side image processor 100, and so on. The system control circuit 114 loads programs stored in the non-volatile memory 113 into the memory 109 and executes those programs to realize the various processes described in the present embodiment. The system control circuit 114 controls the operations of the function blocks through the buses.

A communication data control circuit 115 is included in the system control circuit 114, and controls commands for exchanging image data between the master-side image processor 100 and the slave-side image processor 117. The communication data control circuit 115 also calculates a division size of image data to be processed, in order to divide the image data between the master-side image processor 100 and the slave-side image processor 117 for processing. Note that the image data may be processed only by the master-side image processor 100 or the slave-side image processor 117 depending on the amount of the image data. Details regarding the processing performed by the communication data control circuit 115 will be given later.

An operating member 116 includes switches, buttons, a touch panel, and so on manipulated by a user. The operating member 116 detects various types of user operations such as power on/off, shutter on/off, menu operations, and so on, and communicates those operations to the system control circuit 114. The image capturing circuit 119 includes an image sensor such as a CCD or CMOS sensor that generates image data by converting a received subject image into an electrical signal, an AD converter that converts analog signals from the image sensor into digital signals, and so on.

Configuration of Image Processing Circuit 102

Next, the configuration of the image processing circuit 102, and processing performed by circuits thereof, will be described with reference to FIG. 2. A sensor correction circuit 201 carries out processing such as pixel correction, black level correction, shading correction, and flaw correction on image data input from the image sensor or the data transfer circuit 105. The sensor correction circuit 201 outputs the processed image data to the data transfer circuit 105, an optical correction circuit 202, or both. The optical correction circuit 202 carries out correction processing pertaining to an optical lens, such as magnification chromatic aberration correction, on the image data input from the sensor correction circuit 201 or the data transfer circuit 105. The optical correction circuit 202 outputs the processed image data to the data transfer circuit 105, a development processing circuit 203, or both.

The development processing circuit 203 carries out processing such as gamma correction, luminance/color generation, and so on image data input from the optical correction circuit 202 or the data transfer circuit 105. The development processing circuit 203 then outputs the processed image data to the data transfer circuit 105, an NR processing circuit 204, or both. The NR processing circuit 204 takes image data from one frame previous to noise reduction (NR)-processed image data from the data transfer circuit 105 as an input, and carries out inter-frame NR processing on the image data input from the development processing circuit 203 or the data transfer circuit 105. The NR processing circuit 204 outputs the processed image data to the data transfer circuit 105, a geometric reshaping circuit 205, or both. With respect to the input of image data, two images' worth of data may be input simultaneously from the data transfer circuit 105. The geometric reshaping circuit 205 carries out a geometric reshaping process, such as distortion correction for removing optical lens distortion, on the image data input from the NR processing circuit 204 or the data transfer circuit 105. The geometric reshaping circuit 205 outputs the processed image data to the data transfer circuit 105, a codec circuit 206, or both.

The codec circuit 206 compresses and encodes image data input from the geometric reshaping circuit 205 or the data transfer circuit 105 into the JPEG format, the MPEG format, or the like. Alternatively, in the case where compressed and encoded image data is input, the codec circuit 206 creates decompressed image data by carrying out a decompression process on the encoded image data, and outputs the decompressed image data to the data transfer circuit 105. The processing of the codec circuit 206 will be described in detail later.

Example of Image Data Necessary when Dividing Image and Processing Divided Image Next, a data amount necessary, in the case where divided image data (two divisions, namely upper and lower, in this example) is input into a plurality of image processors, for the processing executed by the image processing blocks will be described with reference to FIGS. 3A and 3B.

Figure 3A:
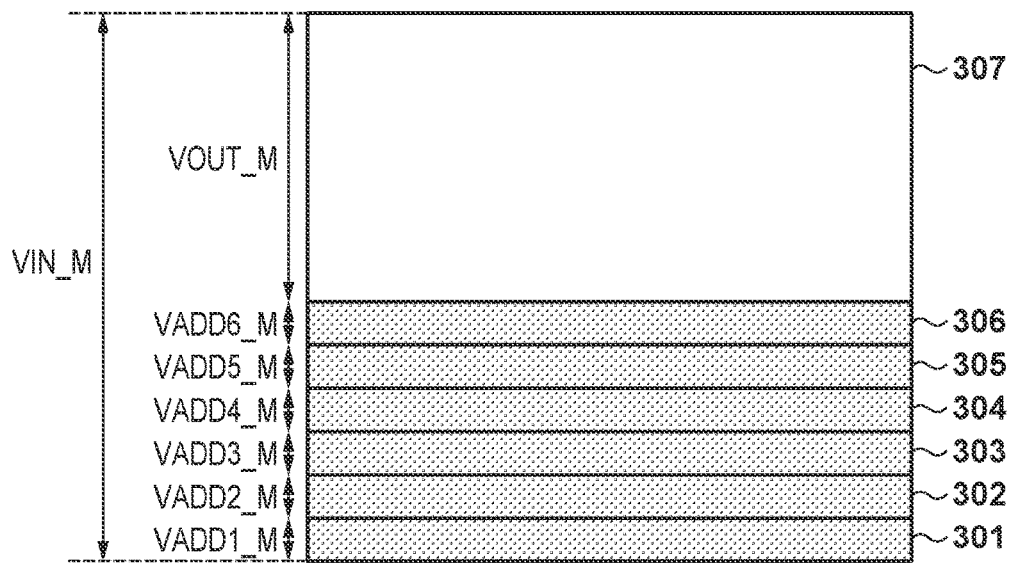
FIG. 3A is a diagram illustrating an example of image data (an upper half) processed by a master-side image processor according to the first embodiment.

FIG. 3A illustrates image data of an upper half of an image, processed by the master-side image processor 100. FIG. 3B, meanwhile, illustrates image data of a lower half of the image, processed by the slave-side image processor 117. In FIG. 3A, VIN_M indicates a number of lines of the image data input into the image processing circuit 102 of the master-side image processor 100, and VOUT_M, indicated by a region 307, indicates a number of output lines of the image data.

VADD1_M indicates a number of lines in an image data region (301) that is deleted after being used in processing carried out by the sensor correction circuit 201 of the image processing circuit 102. VADD2_M and VADD3_M indicate image data regions (302 and 303) that are deleted after being used in processing carried out by the optical correction circuit 202 and the development processing circuit 203, respectively. Likewise, VADD4_M, VADD5_M, and VADD6_M indicate numbers of lines of image data regions (304 to 306) that are deleted after being processed by the NR processing circuit 204, the geometric reshaping circuit 205, and the codec circuit 206, respectively. The image data processed by the image processing circuit 102 of the slave-side image processor 117, indicated in FIG. 3B, will be described later.

FIG. 4 is a diagram illustrating an example of filter coefficients used in a filtering process carried out by the sensor correction circuit 201 according to the present embodiment. The sensor correction circuit 201 has 9×9 tap filter coefficients. The sensor correction circuit 201 uses a pixel value p(x,y) of a processing target pixel of the image data input to the development processing circuit 203 and reference pixels constituted of 9×9 peripheral pixels centered on the processing target pixel to carry out the computation indicated by Formula (1), and outputs a pixel value q(x,y).

$$q(x,y) = \Sigma_{j=-4}^{4} \Sigma_{i=-4}^{4} p(x+i, y+j) * f(i,j) \quad (1)$$

In this example, with respect to the final four lines' worth of the number of lines VIN_M of the image data input to the sensor correction circuit 201, there are no lower-end reference pixels used in the filtering process. Thus, the sensor correction circuit 201 cannot carry out the filtering process. As a result, the number of lines of the image data output from the sensor correction circuit 201 is (VIN_M−4) lines, or in other words, VADD1_M=4.

In the case of carrying out the filtering process illustrated in FIG. 4, no reference pixels are present for four lines on the upper end and four pixels on the left and right ends, and thus the filtering process cannot be carried out. As such, the size of the output image data is smaller than the size of the input image data. Note that the following descriptions will mention only the number of lines in boundary parts arising when the image is divided into upper and lower parts. These "boundary parts" correspond to lower end in the image data during the processing of the master-side image processor 100, and upper end in the image data for the slave-side image processor 117.

Furthermore, VADD2_M=9 lines' worth of data is necessary in the processing carried out by the optical correction circuit 202 of the master-side image processor 100. Additionally, VADD3_M=13 lines, VADD4_M=11 lines, and VADD5_M=135 lines are necessary in the subsequent processing carried out by the development processing circuit 203, the NR processing circuit 204, and the geometric reshaping circuit 205, respectively. VADD6_M=4 lines' worth is necessary in the processing carried out by the codec circuit 206. Accordingly, 192 lines, that is, the total number of lines from VADD1_M to VADD6_M, are necessary.

For example, in the case where the configuration does not transfer data midway through being processed between the image processors as will be described later separately with reference to FIGS. 7A and 7B, it is necessary to process the extra 192 lines' worth of data described above. In other words, to ensure VOUT_M lines' worth of data as the output image data, it is necessary first to input (VOUT_M+192) lines' worth of input image data into the image processing circuit 102. Then, it is necessary to process even the image data deleted by the processing circuits of the image processing circuit 102, in the previous-stage processing circuits.

Referring again to FIG. 3B, the image data used by the image processing circuit 102 of the slave-side image processor 117 will be described. In FIG. 3B, VIN S indicates the number of lines of the image data inputted into the image processing circuit 102 of the slave-side image processor 117. Meanwhile, VOUT_S, indicated by a region 317, indicates the number of lines of image data that are output.

Figure 3B:
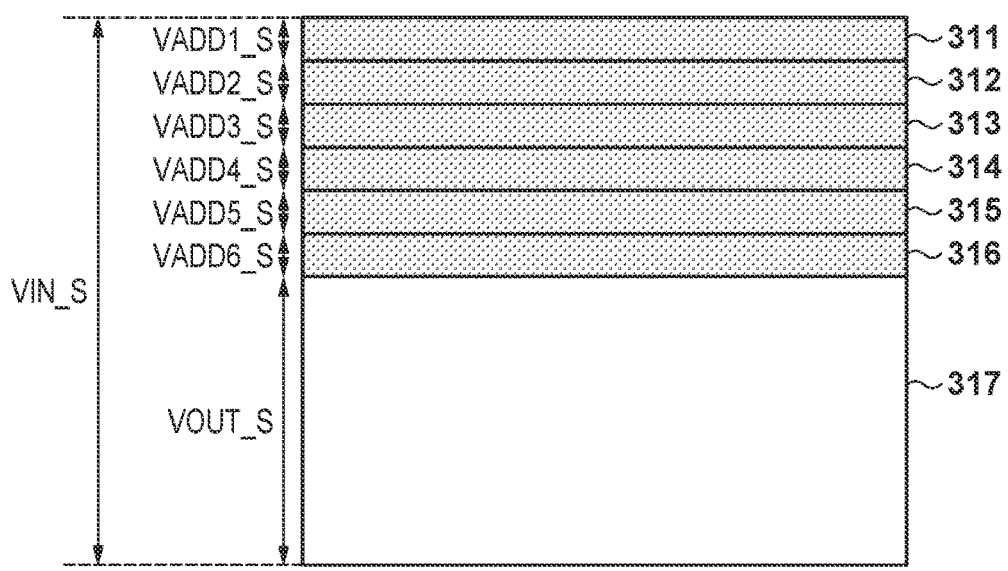
FIG. 3B is a diagram illustrating an example of image data (a lower half) processed by the master-side image processor according to the first embodiment.

In FIG. 3B, VADD1_S indicates the number of lines in the upper end of the image data region that are deleted after the processing performed by the sensor correction circuit 201. Likewise, VADD2_S and VADD3_S indicate image data regions (312 and 313) deleted after the processing performed by the optical correction circuit 202 and the development processing circuit 203, respectively. VADD4_S, VADD5_S, and VADD6_S indicate the number of lines in lower end of image data regions (314 to 316) deleted after the processing performed by the NR processing circuit 204, the geometric reshaping circuit 205, and the codec circuit 206, respectively.

As described above, in the case where data midway through being processed is not transferred between the image processors, 192 lines' worth of data, namely the total number of lines from VADD1_S to VADD6_S, is necessary in the master-side processing. In other words, in the case where data midway through being processed is not transferred between the image processors, it is necessary for the master-side image processor 100 and the slave-side image processor 117 to redundantly process the same image data regions processed by each of those image processors.

Configuration of Codec Circuit 206 and Operations of Circuits Thereof

Figure 5:
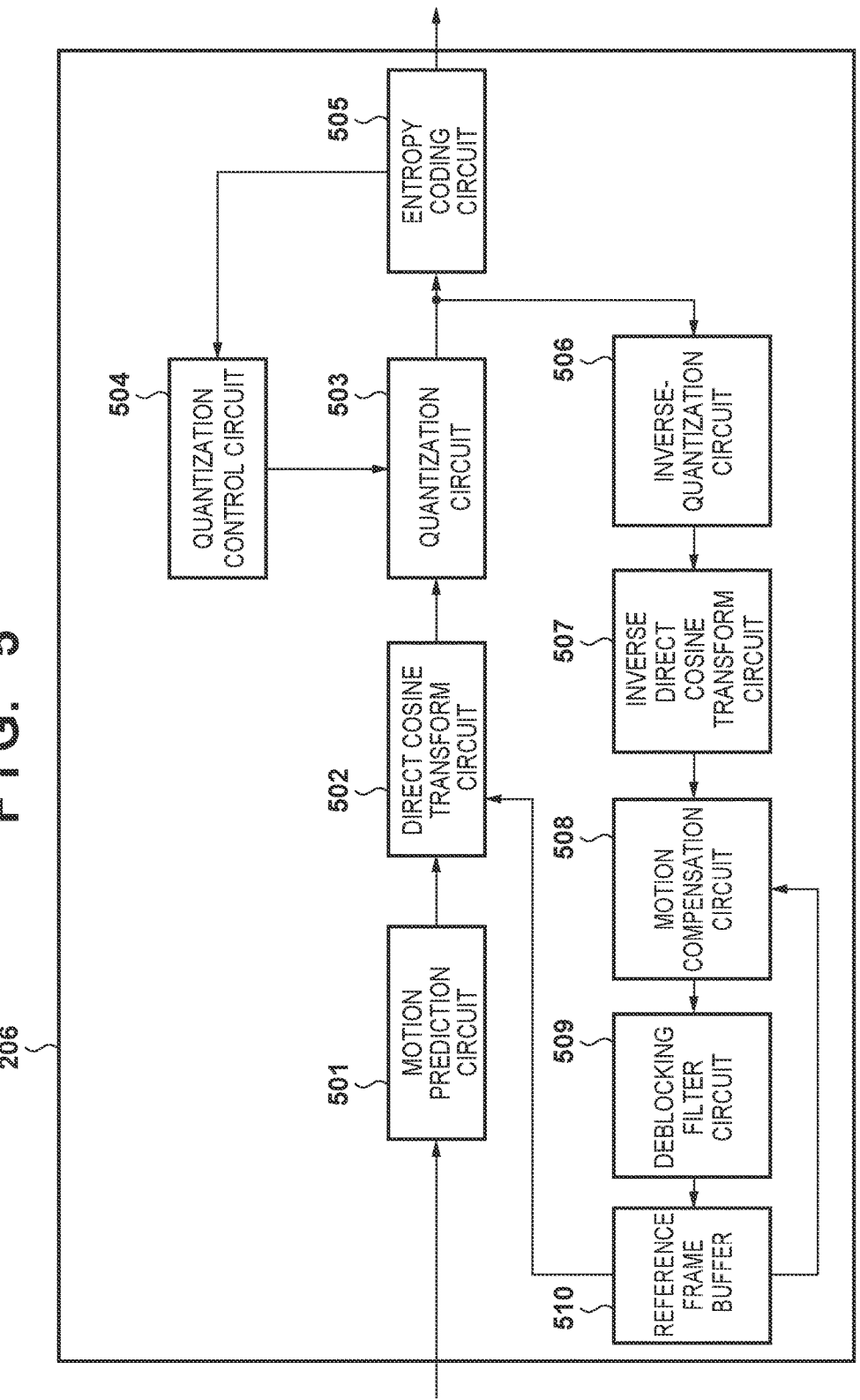
FIG. 5 is a block diagram illustrating an example of the functional configuration of a codec circuit according to the first embodiment.

FIG. 5 illustrates the configuration of the codec circuit 206 according to the present embodiment. A motion prediction circuit 501 obtains the upper-side image data obtained by the upper/lower division described above (from the data transfer circuit 105, for example) in cluster order, in units of macroblocks. The motion prediction circuit 501 carries out block matching between an encoding target image and a reference image input from a reference frame buffer 510 so as to carry out motion vector detection. The motion prediction circuit 501 finds a difference in pixels between the encoding target image and a reference image at the position of the detected motion vector, and outputs a resulting differential image to a direct cosine transform circuit 502. The direct cosine transform circuit 502 carries out a discrete cosine transform on the input differential image, generates transform coefficients, and outputs these to a quantization circuit 503. The quantization circuit 503 quantizes the transform coefficients sent thereto in accordance with quantization parameters output by a quantization control circuit 504. The quantized transform coefficients are output to an entropy coding circuit 505, and to an inverse-quantization circuit 506 for creating a locally-decoded image. The entropy coding circuit 505 carries out variable-length encoding on the quantized transform coefficients. The entropy coding circuit 505 adds variable-length encoded encoding method information such as motion vectors, quantization parameters, and macroblock division information thereto to generate an encoded stream. The amount of code produced for each macroblock during the encoding is calculated and output to the quantization control circuit 504.

The quantization control circuit 504 determines the quantization parameters. The quantization control circuit 504 obtains information indicating whether or not the macroblock to be encoded is in contact with the division boundary of the image (image boundary information). In the case where the macroblock to be encoded is not in contact with the division boundary of the image, the quantization control circuit 504 obtains the amount of code produced from the entropy coding circuit 505, determines the quantization parameters so as to achieve a target code amount, and outputs the quantization parameters to the quantization circuit 503. The inverse-quantization circuit 506 carries out inverse quantization on the input quantized transform coefficients to generate local decoding transform coefficients. These transform coefficients are outputted to an inverse direct cosine transform circuit 507. The inverse direct cosine transform circuit 507 carries out an inverse discrete cosine transform on the input transform coefficients to generate a differential image. The differential image is output to a motion compensation circuit 508. The motion compensation circuit 508 reads out the reference image at the position of the motion vector from the reference frame buffer 510 and adds the input differential image to generate locally-decoded image data.

The image data generated by the motion compensation circuit 508 is output to a deblocking filter 509. The deblocking filter 509 applies a deblocking filter to the input image data. The post-deblocking filter image is stored in the reference frame buffer 510 as a locally-decoded image.

In this manner, the codec circuit 206 generates an encoded stream and a locally-decoded image. Note that the deblocking filter 509 carries out a deblocking filter process based on the H.264 encoding method, for example. However, whether or not to actually carry out the filtering process on a block boundary is determined by the pixel values at the block boundary, encoding parameters, and so on.

Figure 6:
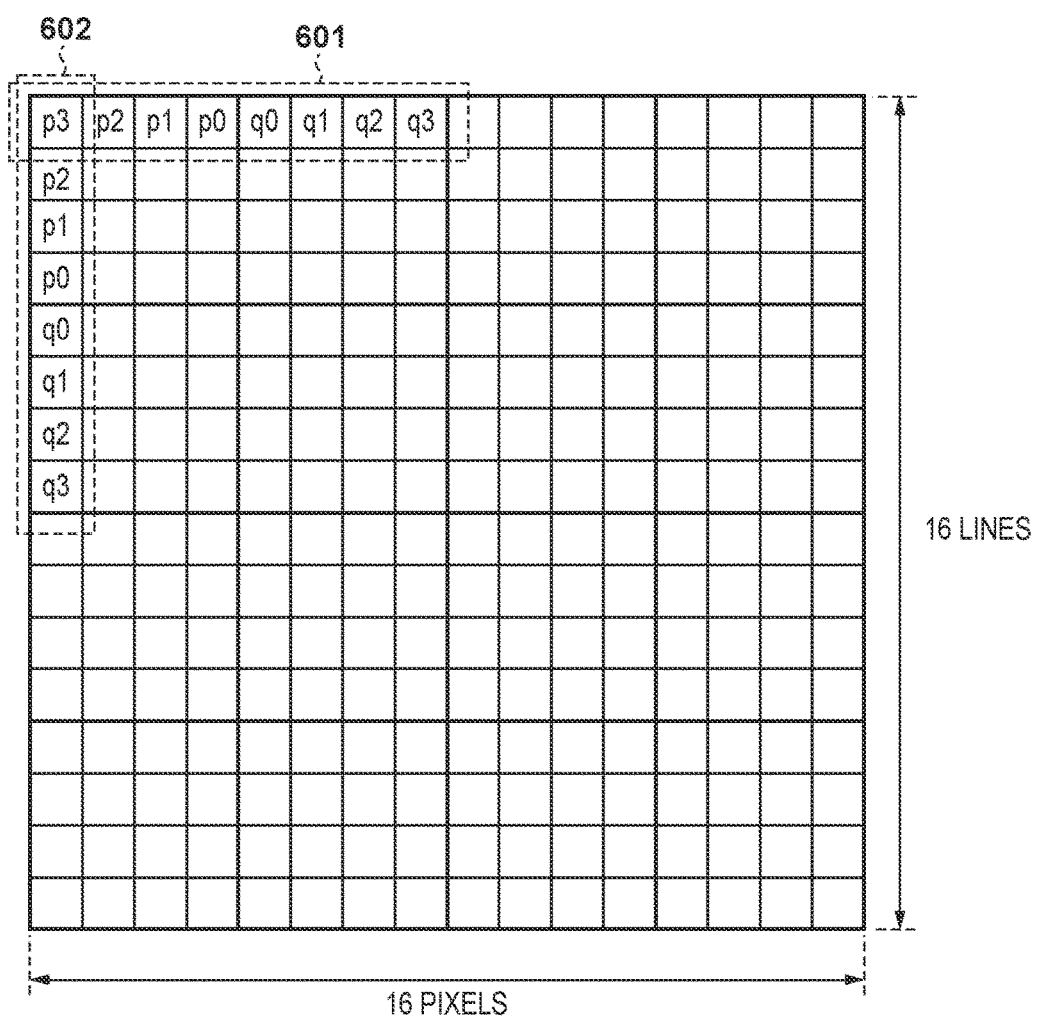
FIG. 6 is a diagram illustrating an example of the structure of a macroblock boundary processed by the codec circuit according to the first embodiment.

FIG. 6 illustrates the configuration of a macroblock boundary processed by the codec circuit 206 according to the present embodiment. In a horizontal direction block boundary indicated by 601, a block constituted of pixel values p0 to q3 and a block constituted of pixel values q0 to q3 are adjacent to each other. Likewise, in a vertical direction block boundary indicated by 602, a block constituted of pixel values p0 to q3 and a block constituted of pixel values q0 to q3 are adjacent to each other.

In the case of a standard based on the H.264 encoding method, the codec circuit 206 carries out the deblocking filter process on the block boundary when the conditions indicated by the following Formula (2) are met.

$$Bs > 0 \ |p0-q0| < \alpha \text{ and } |p1-q0| < \beta \text{ and } |q1-q0| < \beta \quad (2)$$

Here, the Bs (boundary strength) value is a numerical value indicating the strength of the block boundary in the image, whereas p and q are numerical values determined by an intra (in-plane)/macroblock relationship. $\alpha$ and $\beta$ are defined by tables for values IndexA and IndexB, respectively. IndexA and IndexB are calculated from the quantization parameters and an offset value for a filtering strength.

In the case where Bs<4, with inputs of p1, p0, q0, and q1, p'0 and q'0 (where p'0 and q'0 are pixel values obtained through the deblocking filter process on p0 and q0, respectively) are generated through four-tap FIR filter processing. Meanwhile, in the case where |p2−p0|<β, with inputs of p2, p1, p0, and q1, p'1 (where p'1 is a pixel value obtained through the deblocking filter process on p1) is generated through four-tap FIR filter processing. Additionally, in the case where |q2−q0|<β, with inputs of q2, q1, q0, and p1, q'1 (where q'1 is a pixel value obtained through the deblocking filter process on q1) is generated through four-tap FIR filter processing.

In the case where Bs=4, the following processing is carried out. In the case where |p2−p0|<β and |p0−p0|<α/4+2, with inputs of p2, p1, p0, q0, and q1, p'0 is generated through five-tap FIR filter processing. With inputs of p2, p1, p0, and q1, p'1 is generated through four-tap FIR filter processing. In the case of a luminance signal, with inputs of p3, p2, p1, p0, and q0, p'2 is generated through five-tap FIR filter processing. In other cases, with inputs of p1, p0, and q1, p'0 is generated through three-tap FIR filter processing.

In the case where |q2−q0|<β, and |p0−p0|<α/4+2, with inputs of q2, q1, q0, p0, and p1, q'0 is generated through five-tap FIR filter processing. Meanwhile, with inputs of q2, q1, q0, and p0, q'1 is generated through four-tap FIR filter processing. In the case of a luminance signal, with inputs of q3, q2, q1, q0, and p0, q'2 is generated through five-tap FIR filter processing. In other cases, with inputs of q1, q0, and p1, q'0 is generated through three-tap FIR filter processing.

Image Division and Inter-Processor Communication Process According to Present Embodiment The division of an image and inter-processor processing according to the present embodiment will be described next. In other words, in the present embodiment, the image division described hereinafter is carried out, instead of the image division described with reference to FIGS. 3A and 3B, in order to reduce the amount of image data input to each processor. Although this image division makes it necessary for the processors to communicate with each other as the processing of each block progresses in the image processing circuit 102, a common communication method is used. Thus, the processing of the codec circuit 206 and the inter-processor communication corresponding to the processing of the codec circuit 206 will be described as examples for each block.

Figure 7A:
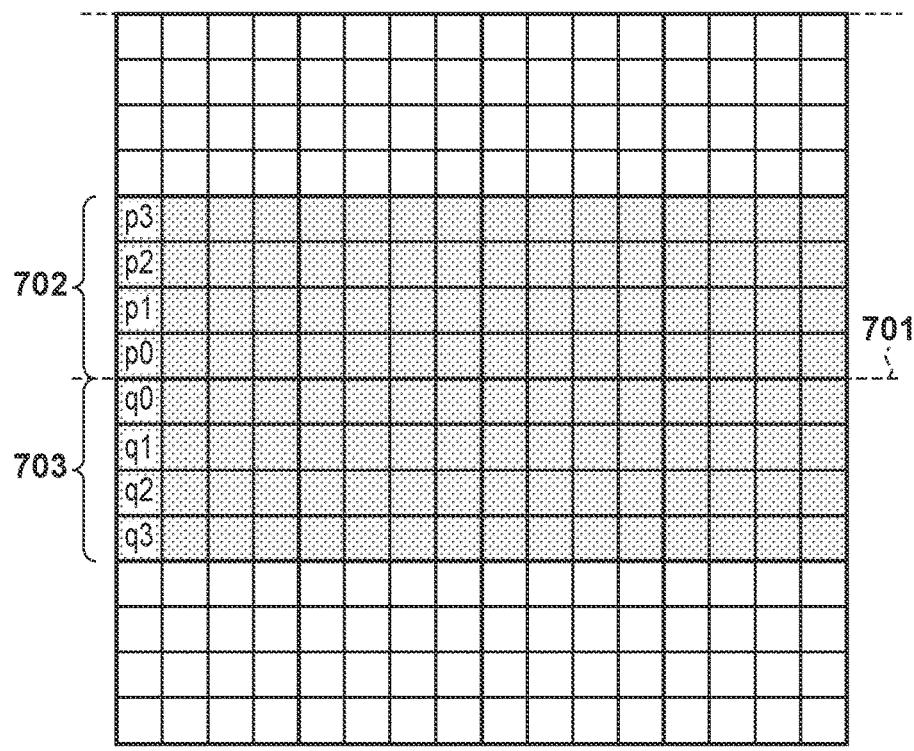
FIG. 7A is a diagram illustrating an example of data in a boundary region of image data processed by the codec circuit according to the first embodiment, in units of pixel signals.
Figure 7B:
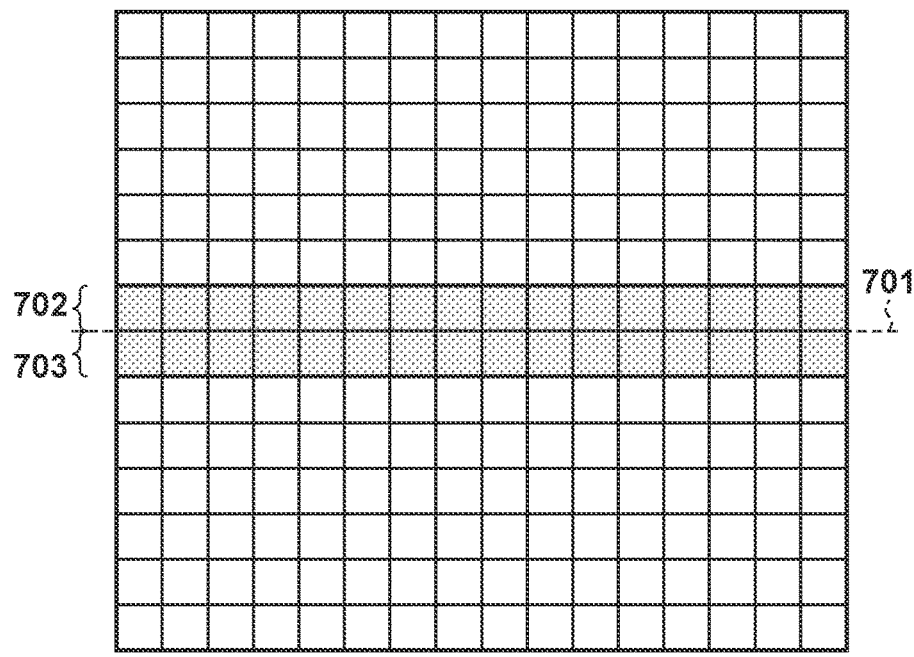
FIG. 7B is a diagram illustrating an example of data in a boundary region of image data processed by the codec circuit according to the first embodiment, in units of encoded blocks.

FIG. 7A illustrates the boundary region of the image data processed by the codec circuit 206 included in the master-side image processor 100, in units of pixels. In FIG. 7A, each square indicates an individual pixel. FIG. 7B is a diagram illustrating the boundary region of the image data processed by the codec circuit 206, in units of encoded blocks. Each square indicated in FIG. 7B indicates an encoded block of 4×4 of the pixels indicated in FIG. 7A. A dotted line 701 indicated in FIGS. 7A and 7B indicates a boundary in the upper/lower division of the image data. The master-side image processor 100 processes the image data above the dotted line 701, whereas the slave-side image processor 117 processes the image data below the dotted line 701. In the present embodiment, a single image is divided such that there are no identical pixel data regions input to the two image processors. In other words, using the example illustrated in FIGS. 3A and 3B, VADD6_M=0 and VADD6_S=0.

In the case where the deblocking filter 509 of the master-side image processor 100 processes the blocks contained in a region 702, the blocks in a region 703 corresponding to a predetermined range in the adjacent lower image data are necessary, as described above. Accordingly, the deblocking filter 509 of the master-side image processor 100 obtains the blocks of the region 703 from the communication circuit 104 of the slave-side image processor 117 to execute a deblocking filter process on the block boundary. Note that the communication (the transfer of image data) between the master-side image processor 100 and the slave-side image processor 117 is executed under the control of the communication data control circuit 115. The blocks in the region 703 undergo the same processing in the slave-side image processor 117 up to the geometric reshaping circuit 205, and thus the deblocking filter processing can be continued by the codec circuit 206 (on the master side).

On the other hand, in the case where the deblocking filter 509 of the slave-side image processor 117 processes the blocks contained in the region 703, the blocks in the region 702 corresponding to a predetermined range in the adjacent upper image data are necessary. Accordingly, the blocks for which the deblocking filter processing on the region 702 is complete are obtained from the communication circuit 104 of the master-side image processor 100, and the deblocking filter processing is carried out on the block boundary corresponding to the upper/lower division. Like the region 703, the blocks in the region 702 undergo the same image processing in the master-side image processor 100 up to the geometric reshaping circuit 205, and thus the deblocking filter processing can be continued by the codec circuit 206 (on the slave side). Note that the deblocking filter is not applied to all of the block boundaries, and thus only the blocks in the locations where the filter is applied may be transferred between the image processors.

As described thus far, according to the present embodiment, in the case where the processing of a single image is divided between the master-side image processor 100 and the slave-side image processor 117, image data not having identical regions is inputted into the respective processors. The image data near the boundary that is additionally necessary at each stage is then communicated between the processors as each stage of image processing progresses. By doing so, a predetermined number of lines processed by the blocks in the image processing circuit 102 of each processor can be eliminated (in the case of the codec circuit 206, for example, VADD6_M=4, as indicated in FIG. 3A). By eliminating the data of (for example, VADD6_M) lines, processing on extra regions becomes unnecessary in the previous stages of the processing, namely that performed by the sensor correction circuit 201 to the geometric reshaping circuit 205, which makes it possible to shorten the processing time and reduce power consumption.

Second Embodiment

A second embodiment will be described next. The second embodiment will describe a configuration in which the image processing circuit 102 includes a vector detection circuit that detects a motion vector, and in the process by which the vector detection circuit detects the motion vector, necessary data spanning the division boundary is obtained. The configuration of the digital camera 150 according to the second embodiment is the same as the configuration of the digital camera 150 according to the first embodiment, with the exception of one circuit in the internal circuit configuration of the image processing circuit 102. Accordingly, corresponding elements will be given the same reference numerals, redundant descriptions will be omitted, and the descriptions will focus on the differences.

Configuration of Image Processing Circuit 102

Figure 8:
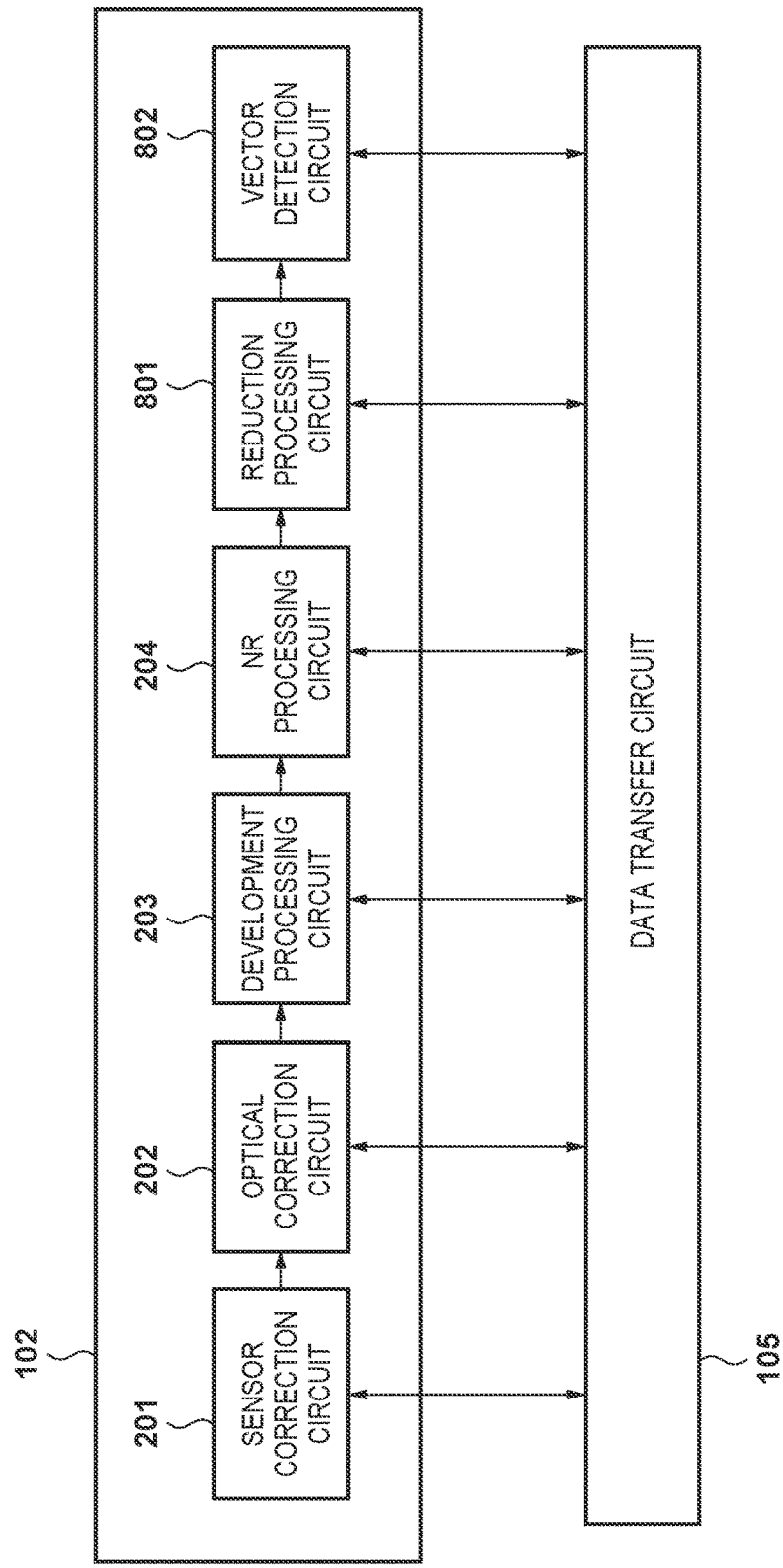
FIG. 8 is a block diagram illustrating an example of the functional configuration of an image processing circuit according to a second embodiment.

The configuration of the image processing circuit 102 according to the present embodiment will be described first with reference to FIG. 8. As in the first embodiment, the image data processed by the development processing circuit 203 is output to the NR processing circuit 204, the data transfer circuit 105, or both. The image data processed by the NR processing circuit 204 is output to the data transfer circuit 105, a reduction processing circuit 801, or both.

The reduction processing circuit 801 carries out a reduction process on the image data according to a pre-set ratio, and outputs the reduced image data to the data transfer circuit 105. The reduced image data is input to a vector detection circuit 802 via the data transfer circuit 105. The vector detection circuit 802 carries out template matching between a current frame and the frame previous to the current frame, in order to detect vector data at each of points (at each of coordinate positions). The detected vector data is used in processing such as stabilization for moving picture data.

Figure 11:
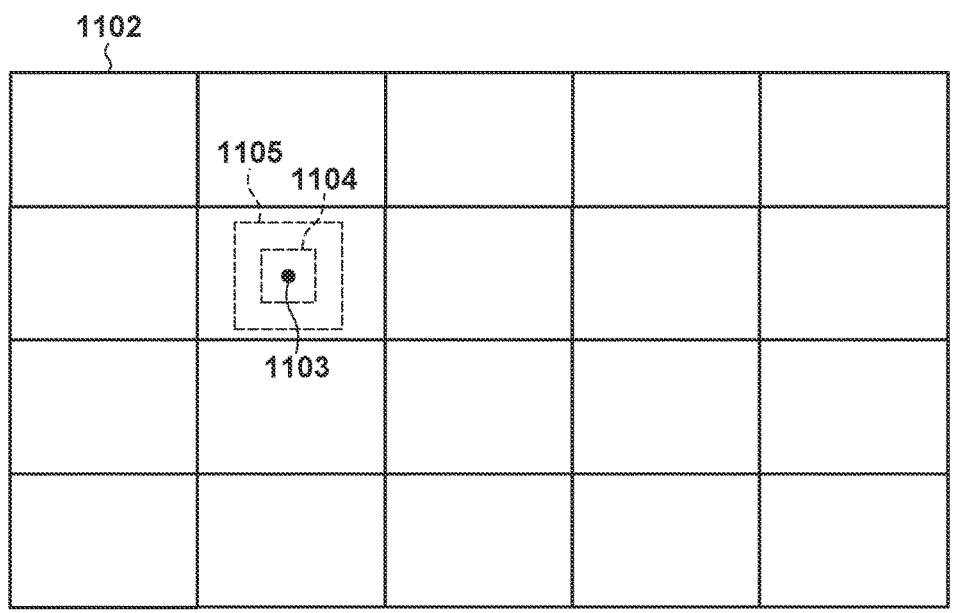
FIG. 11 is a diagram illustrating a relationship between a grid arrangement for the vector detection circuit to read out image data, a feature point, and a template matching region according to the second embodiment.

Next, processing performed by the vector detection circuit 802 will be described. First, FIG. 11 illustrates a relationship between a grid arrangement read out by the vector detection circuit 802, and a template region and the like. In other words, grids 1102 having a predetermined size are arranged such that a set number thereof are provided in the horizontal and vertical directions (in the example illustrated in FIG. 11, a total of 20 grids, namely five horizontal and four vertical grids, are arranged). A single feature point 1103 is extracted in each grid, and a search region 1105 and a template region 1104 that are quadrangular and have set sizes are set central to the feature point 1103.

Configuration of and Series of Operations Performed by Vector Detection Circuit 802

Figure 9:
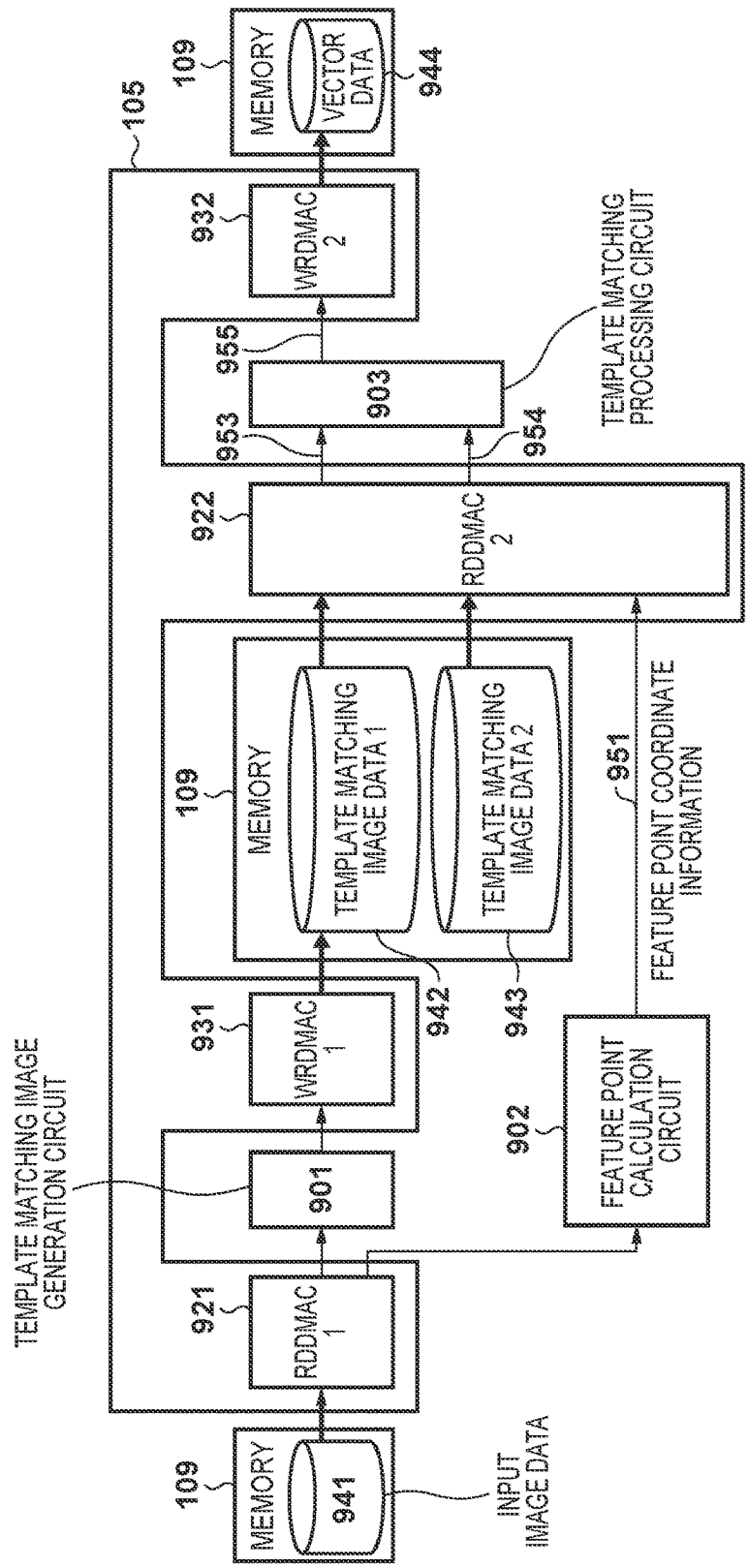
FIG. 9 is a diagram illustrating an example of the functional configuration of a vector detection circuit according to the second embodiment, along with a relationship with a data transfer circuit.
Figure 10:
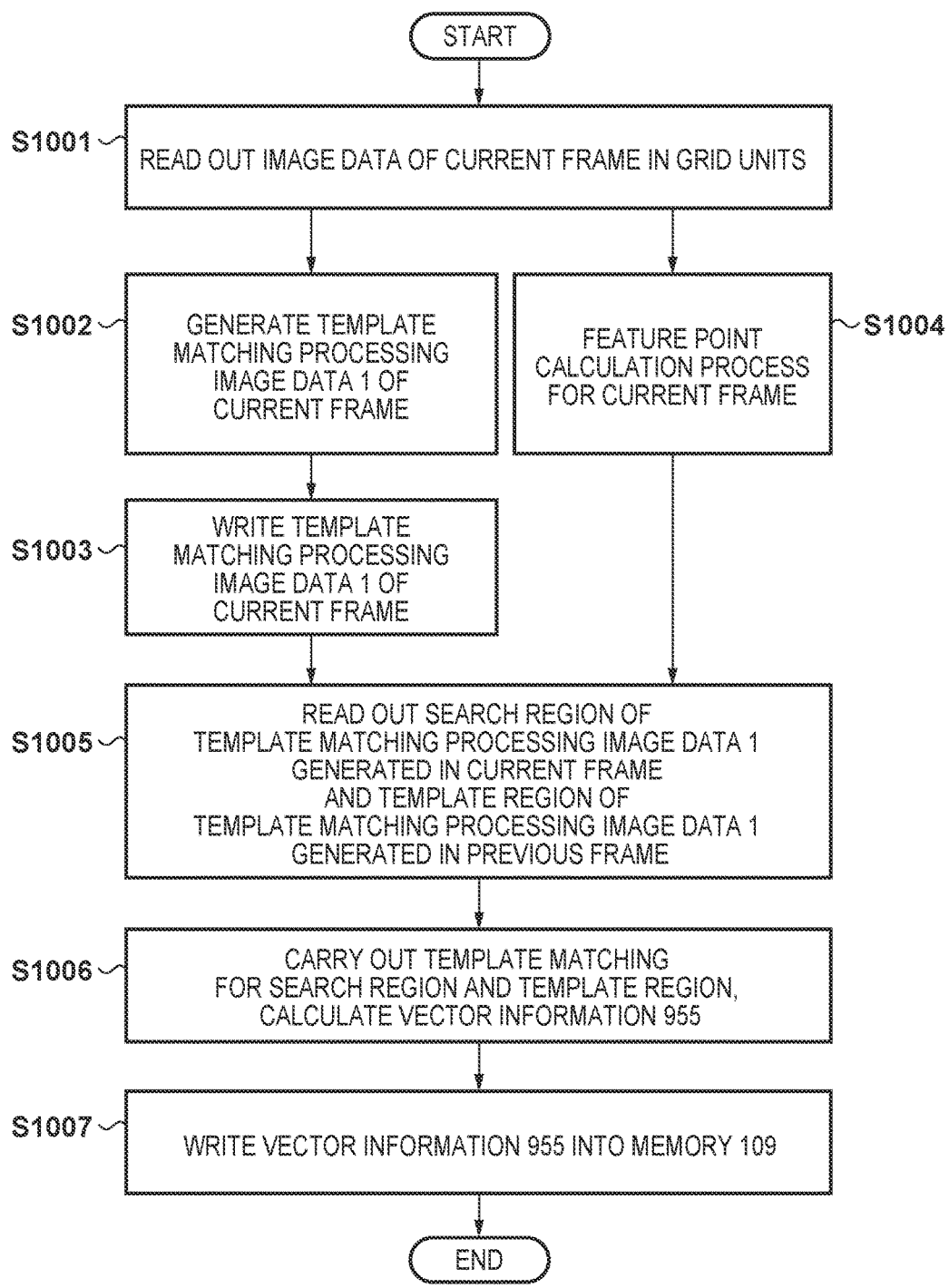
FIG. 10 is a flowchart illustrating a series of operations carried out by the vector detection circuit according to the second embodiment.

An example of the functional configuration of the vector detection circuit 802 will be described while describing an overview of the vector detection process performed by the vector detection circuit 802, with reference to FIGS. 9 and 10. Note that the series of operations described hereinafter are carried out by the system control circuit 114 loading and executing programs stored in the non-volatile memory 113, and controlling the circuits constituting the processors or the communication data control circuit 115. Additionally, the processing performed by the vector detection circuit 802 is started in the case where, for example, divided input image data can be input into an RDDMAC 1 (921) of the data transfer circuit 105.

In S1001, the RDDMAC 1 (921), which controls readout, reads out input image data 941 of the current frame, which is a target for vector detection, from the memory 109, in units corresponding to the size of the predetermined grids 1102 illustrated in FIG. 11. The input image data 941 stored in the memory 109 has undergone the above-described image processing performed by each of the blocks in the image processing circuit 102. The input image data 941 read out in grid units by the RDDMAC 1 (921) is output to a template matching image generation circuit 901 and a feature point calculation circuit 902, which are blocks in later stages.

In S1002, the template matching image generation circuit 901 generates a template matching image used in template matching during the vector detection, and outputs the template matching image to a WRDMAC 1 (931), which controls writing. The template matching image generation circuit 901 includes a band pass filter circuit, for example, and cuts high-frequency and low-frequency components of the image signal, which are not needed in the template matching process. The template matching image generation circuit 901 also carries out a binarizing process on the input image data in order to reduce the amount of computation carried out in the template matching process. Specifically, in the case where the input image data 941 is luminance data having a bit depth of 14 bits, the luminance data is converted to binary data having a bit depth of 1 bit through a threshold determination in the filtering process carried out by the band pass filter circuit.

In S1003, the WRDMAC 1 (931) carries out a process of writing input template matching image data 1 (942). Meanwhile, template matching image data 2 (943) generated in the previous frame is stored in the memory 109. As described above, the template matching image data 1 (942) and the template matching image data 2 (943) are binary data.

In S1004, the feature point calculation circuit 902 carries out a feature point calculation process on the image data from the current frame, in grid units, in parallel with the processing of S1002 and S1003. The feature point calculation circuit 902 includes a feature filter circuit, a feature evaluation circuit, and a feature point determination circuit. The feature filter circuit is constituted of a plurality of filters, such as a band pass filter, a horizontal differential filter, a vertical differential filter, and a smoothing filter. For example, the feature filter circuit cuts unnecessary high-frequency and low-frequency components from the image signal using the band pass filter, and applies smoothing filter processing to each of a signal obtained by applying the horizontal differential filter and a signal obtained by applying the vertical differential filter. Furthermore, with respect to the grid subjected to the filtering processing by the feature filter circuit, the feature evaluation circuit uses a feature evaluation formula to evaluate points in which differential values in the periphery of pixels are high in multiple directions, such as points of intersection between two edges in each pixel or points in a curve shape where a curvature factor is maximum, so as to calculate feature values. The Shi and Tomasi method will be described as an example of the processing carried out by the feature evaluation circuit according to the present embodiment. First, the feature point calculation circuit 902 creates an autocorrelation matrix H from the results of applying the horizontal differential filter and the vertical differential filter. The formula of the autocorrelation matrix H is indicated by Formula (3).

$$H = G * \begin{pmatrix} Ix^2 & IxIy \\ IxIy & Iy^2 \end{pmatrix} \quad (3)$$

In Formula (3), Ix and Iy represent the results of applying the horizontal differential filter and the vertical differential filter, respectively, which are convolved with a Gaussian filter G. Next, the feature point calculation circuit 902 calculates the Shi and Tomasi feature evaluation formula indicated in Formula (4).

$$\text{Shi and Tomasi} = \min(\lambda 1 / \lambda 2) \quad (4)$$

Formula (4) indicates the lower of eigenvalues $\lambda 1$ and $\lambda 2$ in the autocorrelation matrix H indicated in Formula (3) as a feature value.

The feature point determination circuit determines the pixel in the grid having the highest feature value, calculated by the feature evaluation circuit for each pixel, as a feature point. The determined feature point is stored in an internal memory or register of the feature point calculation circuit 902 for each of the grids. The memory or register has a capacity for storing the feature point of the previous frame and the feature point of the current frame. Then, when the template matching process for the corresponding grid is started, the feature point determination circuit inputs the feature point calculated in the previous frame into a RDDMAC 2 (922) as feature point coordinate information 951.

In S1005, the RDDMAC 2 (922) reads out a quadrangular region of a predetermined size from template matching image data 1 generated in the current frame and template matching image data 2 generated in the previous frame. The quadrangular region of a predetermined size is extracted as a region centered on the feature point 1103, on the basis of the feature point coordinate information 951 calculated in the input previous frame. Note that the search region 1105 is read out from the template matching image data 1 and the template region 1104 is read out from the template matching image data 2 generated in the previous frame. The pieces of image data that have been read out are input to a template matching processing circuit 903 as search region image data 953 and template region image data 954, respectively.

In S1006, the template matching processing circuit 903 calculates a correlation value between the input search region image data 953 and template region image data 954, and calculates a vector value on the basis of the calculated correlation value. In the present embodiment, the sum of absolute difference (abbreviated as "SAD" hereinafter) is used as the method for calculating the correlation value.

$$S\_SAD = \Sigma_i \Sigma_j |f(i,j) - g(i,j)| \quad (5)$$

Here, f(i,j) represents a pixel value at coordinates (i,j) in the template region image data 954, whereas g(i,j) represents a pixel value in the region of the search region image data 953 that is the target of the correlation value calculation. The correlation value calculation target region is the same size as the template region image data 954. According to SAD, the absolute values of the differences between the pixel values f(i,j) and g(i,j) in the respective regions is calculated, and the sum thereof is found to obtain a correlation value S_SAD. Accordingly, the lower the value of the correlation value S_SAD, the lower the difference between luminance values is among regions, which indicates that textures within the respective correlation value calculation regions resemble each other. To rephrase, finding a degree of change at which the correlation value S_SAD is lowest makes it possible to find a region corresponding between images. At this time, the search region image data 953 and the template region image data 954 are 1-bit binary data, and thus there is an advantage in that only a small amount of computation is required to find the correlation value S_SAD. Although SAD is used as an example of the correlation value in the present embodiment, the method is not limited thereto. Another correlation value such as the sum of squared difference (SSD) or normalized cross-correlation (NCC) may be used as well. The template matching processing circuit 903 calculates a motion vector of the grid on the basis of the position where the correlation value has a minimum value, and outputs calculated vector information 955 to a WRDMAC 2 (932).

In S1007, the WRDMAC 2 (932) writes the vector information 955 into the memory 109 via the data bus 107. Upon the WRDMAC 2 (932) finishing the writing of the vector information 955 into the memory 109, the vector detection circuit 802 ends the motion vector detection process. The foregoing processing is described as processing for a single frame, but the vector data is calculated by applying the same processing to each frame.

Figure 12:
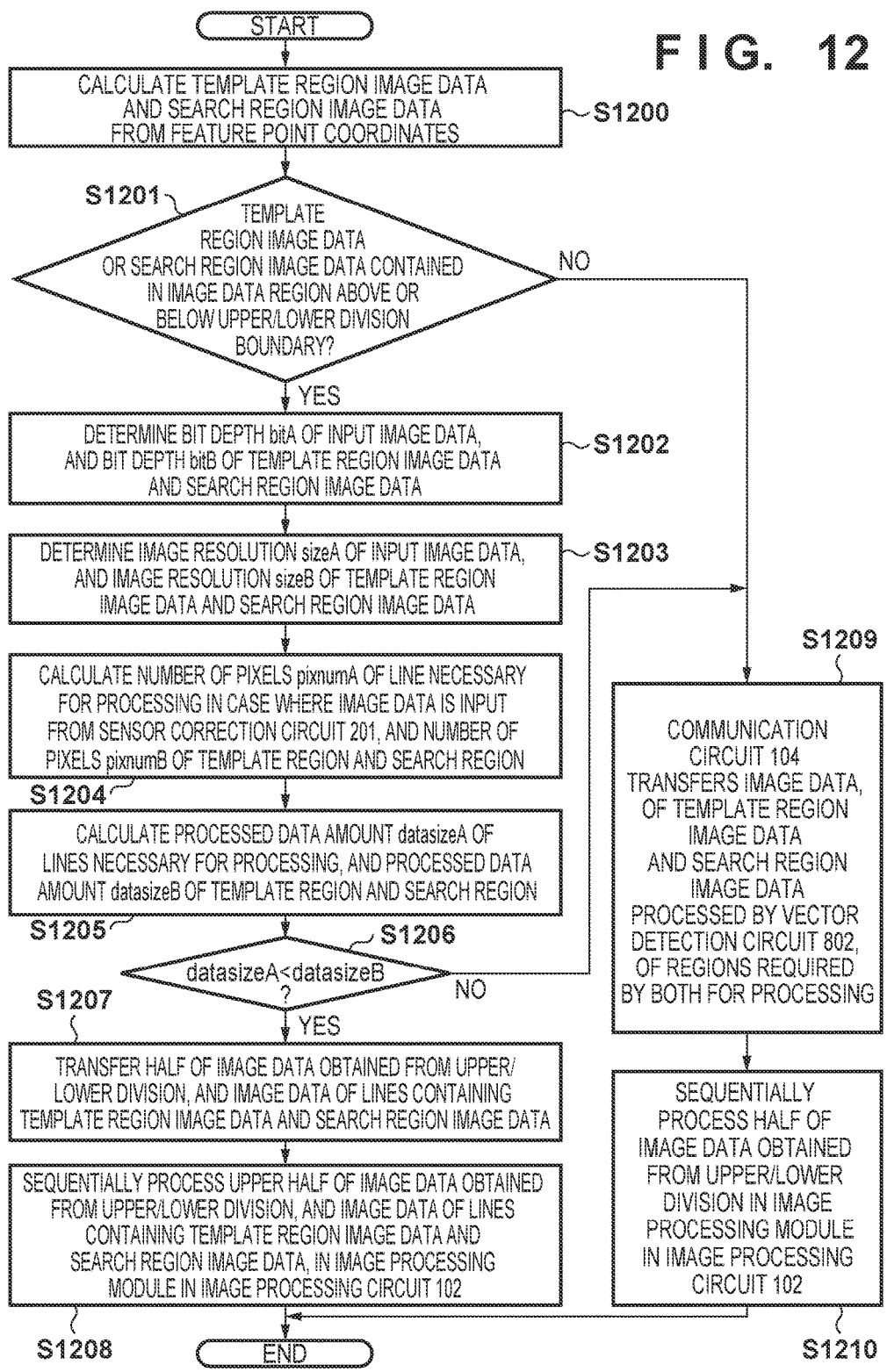
FIG. 12 is a flowchart illustrating a series of operations in a vector detection process and a data communication process pertaining to a boundary region when dividing image data into upper and lower parts, according to the second embodiment.

Series of Operations for Vector Detection Process and Data Communication Process Next, the vector detection process pertaining to the boundary region of the image data obtained through upper/lower division, and the data communication process between the processors, carried out by the master-side image processor 100 and the slave-side image processor 117, will be described with reference to FIG. 12.

To describe the series of operations, an image data region processed by the vector detection circuit 802 will be described with reference to FIGS. 13, 14A, and 14B. Like FIGS. 3A and 3B, FIGS. 14A and 14B illustrate necessary amounts of data in the case where image data is not communicated between the master-side image processor 100 and the slave-side image processor 117. FIG. 14A illustrates image data of an upper half, which is processed by the master-side image processor 100, and FIG. 14B illustrates image data of a lower half, which is processed by the slave-side image processor 117. In FIG. 14A, VIN_M indicates a number of lines of the image data input into the image processing circuit 102 of the master-side image processor 100, and VOUT_M, indicated by a region 1407, indicates a number of output lines of the image data. Furthermore, VADD1_M indicates a number of lines in an upper end of the image data region, which is deleted after being used in the processing carried out by the sensor correction circuit 201. Likewise, VADD2_M, VADD3_M, and VADD4_M indicate the number of lines in the upper end of image data regions (1401 to 1404) that are deleted after being used in the processing performed by the optical correction circuit 202, the development processing circuit 203, and the NR processing circuit 204, respectively. Additionally, VADD5_M and VADD6_M indicate the number of lines in the upper end of image data regions (1405 and 1406) that are deleted after being used in the processing performed by the reduction processing circuit 801 and the vector detection circuit 802, respectively.

Likewise, in FIG. 14B, VIN_S indicates a number of lines of the image data input into the image processing circuit 102 of the slave-side image processor 117, and VOUT_S, indicated by a region 1417, indicates a number of output lines of the image data. Furthermore, VADD1_S indicates a number of lines in a lower end of the image data region, which is deleted after being used in the processing carried out by the sensor correction circuit 201. Likewise, VADD2_S, VADD3_S, and VADD4_S indicate the number of lines in the lower end of image data regions (1411 to 1414) that are deleted after being used in the processing performed by the optical correction circuit 202, the development processing circuit 203, and the NR processing circuit 204, respectively. VADD5_S and VADD6_S indicate the number of lines in the lower end of image data regions (1415 and 1416) that are deleted after being used in the processing performed by the reduction processing circuit 801 and the vector detection circuit 802, respectively.

The following will describe a case in which image data output by the AD converter converting an analog signal from the image sensor into a digital signal has 3840 horizontal pixels and 2160 vertical pixels as an example. The data of the upper half of the image data output from the AD converter of the master-side image processor 100 is transferred to the image processing circuit 102 of the master-side image processor 100. On the other hand, the data of the lower half of the image data is transferred to the slave-side image processor 117 via the communication circuits 104 of the processors.

However, in the present embodiment, the image data is communicated between the master-side image processor 100 and the slave-side image processor 117. As will be described later separately, the communication data control circuit 115 determines which region in the upper side of the image data will be processed by the master-side image processor 100 and up to which region in the lower side will be transferred to the slave-side image processor 117. Details regarding the processing performed by the communication data control circuit 115 will be given later.

In the present embodiment, the reduction processing circuit 801 subjects the image data having 3840 horizontal pixels and 2160 vertical pixels to a reduction process that reduces the pixels by ½ in both the horizontal and vertical directions, for example. In the case where the determination made by the communication data control circuit 115 results in the data being transferred to the image processors at a position corresponding to exactly halfway in the horizontal direction, the reduction processing circuit 801 outputs image data having 1920 horizontal pixels and 540 vertical pixels, as indicated in FIG. 13.

As in the above-described vector detection process, the template region image data is read out from the binary image data of the previous frame, central to the feature point obtained in the previous frame, the search region image data is read out from the binary image data of the current frame, and template matching is carried out. Note that the template region image data is, for example, 48 horizontal pixels and 48 vertical pixels, whereas the search region image data is, for example, 96 horizontal pixels and 96 vertical pixels.

Figure 13:
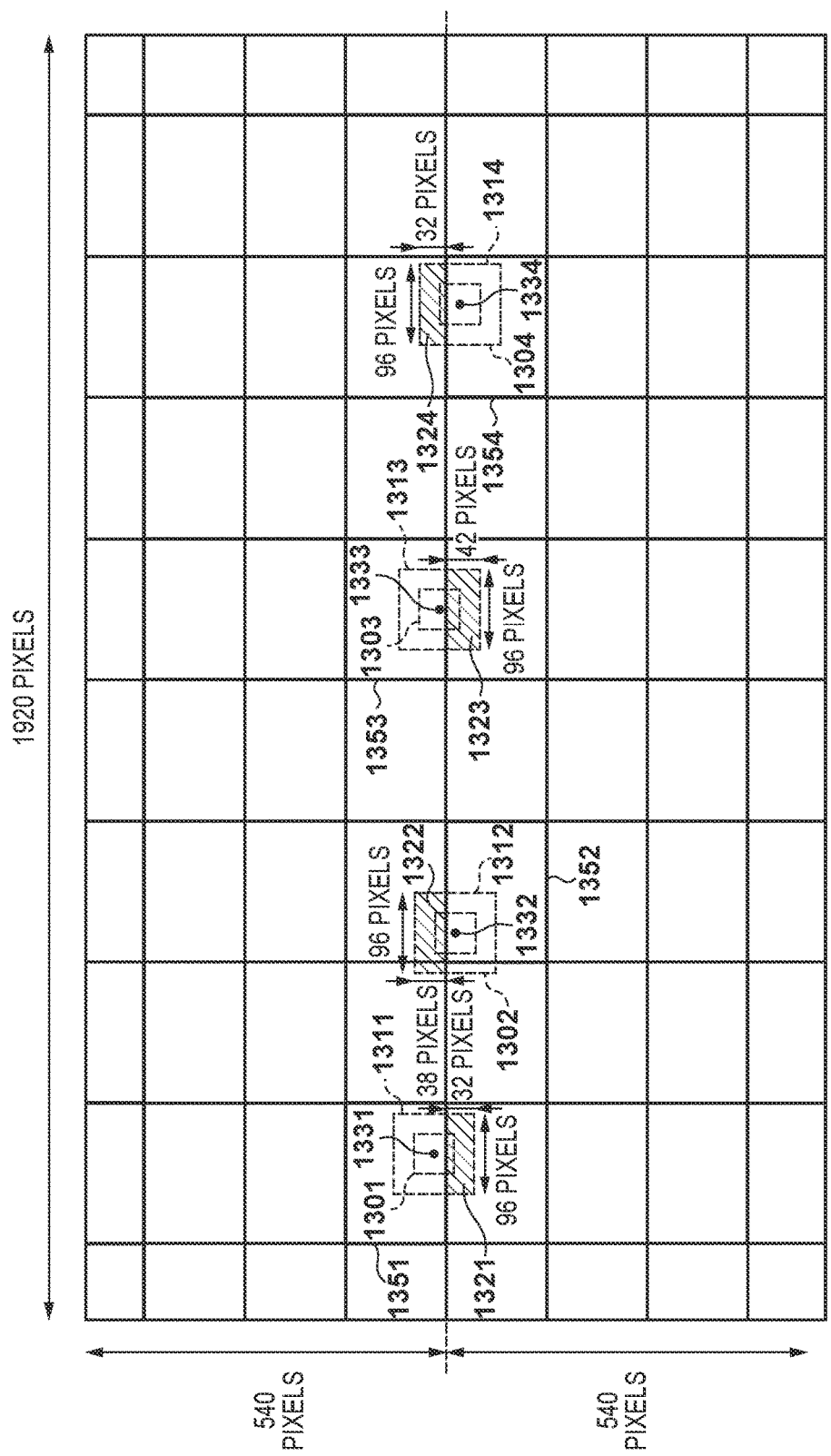
FIG. 13 is a diagram illustrating regions of image data processed by the vector detection circuit according to the second embodiment.
Figure 14A:
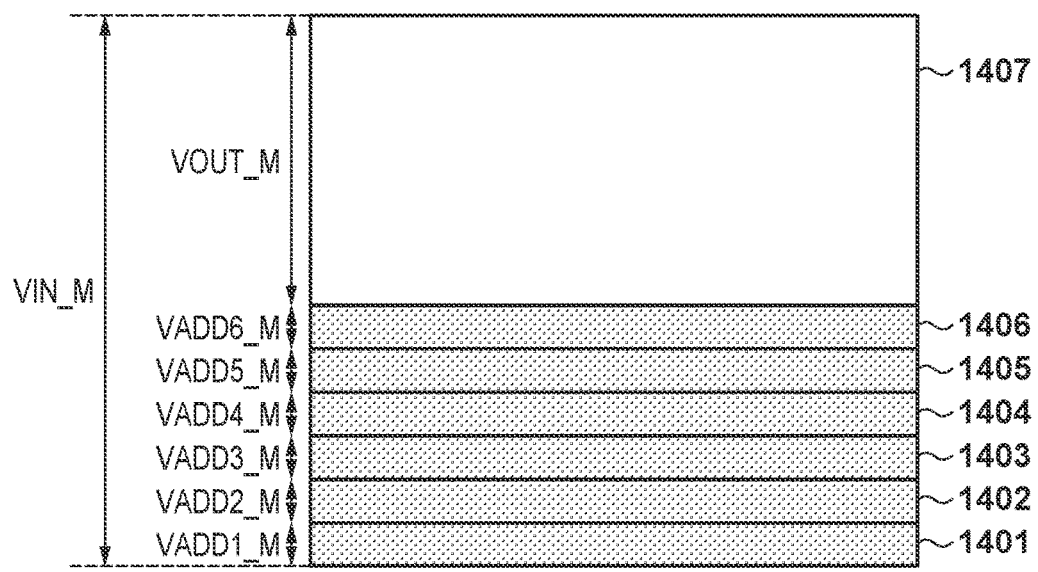
FIG. 14A is a diagram illustrating an example of an upper half of image data processed by a master-side image processor 100 according to the second embodiment.
Figure 14B:
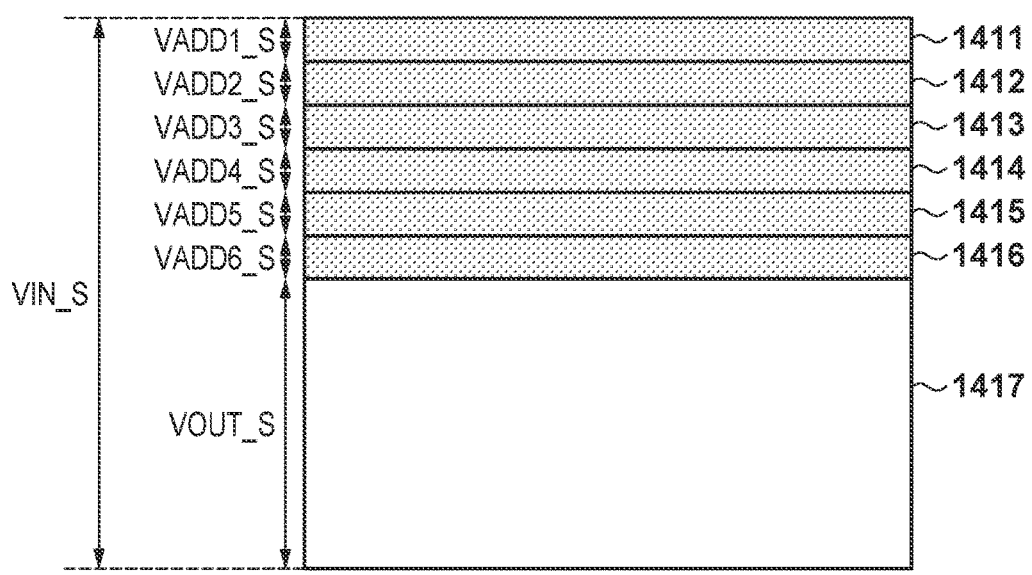
FIG. 14B is a diagram illustrating an example of a lower half of image data processed by a slave-side image processor 117 according to the second embodiment.

The data of the 540 pixels above the dotted line indicated in FIG. 13 is data processed in the master-side image processor 100. However, as can be seen from a grid 1351, for example, data from a region not held by the master-side image processor 100 is necessary. In other words, a feature point 1331 is present near the lower end of the grid 1351, and thus a hatched region 1321 on the lower ends of a template region 1301 and a search region 1311 (96 horizontal pixels and 32 vertical pixels, for example) is not a target of processing by the master-side image processor 100. Likewise, in a grid 1353, a feature point 1333 is present near the lower end of the grid, and thus a hatched region 1323 on the lower ends of a template region 1303 and a search region 1313 (96 horizontal pixels and 42 vertical pixels, for example) is not a target of processing by the master-side image processor 100.

Conversely, the data of the 540 pixels below the dotted line indicated in FIG. 13 is data processed in the slave-side image processor 117. However, as can be seen from a grid 1352, for example, data from a region not held by the slave-side image processor 117 is necessary. In other words, a feature point 1332 of the grid 1352 is present near the upper end of the grid, and thus a hatched region 1322 on the upper ends of a template region 1302 and a search region 1312 (96 horizontal pixels and 38 vertical pixels, for example) is not a target of processing by the slave-side image processor 117. Likewise, in a grid 1354, a feature point 1334 is present near the upper end of the grid, and thus a hatched region 1324 on the upper ends of a template region 1304 and a search region 1314 (96 horizontal pixels and 32 vertical pixels, for example) is not a target of processing by the slave-side image processor 117.

Next, the vector detection process pertaining to the boundary region in the image data, and the data communication process between the processors, carried out under the circumstances illustrated in FIG. 13 will be described with reference to FIG. 12. Note that the series of operations described hereinafter are carried out by the system control circuit 114 loading and executing programs stored in the non-volatile memory 113, and controlling the circuits constituting the processors or the communication data control circuit 115.

In S1200, the communication data control circuit 115 calculates the template region image data and the search region image data using the coordinates of the feature point in the immediately-previous frame, calculated by the feature point calculation circuit 902 of the vector detection circuit 802. In the example illustrated in FIG. 13, the search region 1311 and the template region 1301 are calculated for the feature point 1331, for example.

In S1201, the communication data control circuit 115 determines whether the template region image data and the search region image data of a grid included in the upper side of the image data obtained through the upper/lower division are present in a region of the lower-side image data. In the example illustrated in FIG. 13, the communication data control circuit 115 determines that the hatched regions 1321 and 1323 of the template region image data 1301 and 1303 and the search region image data 1311 and 1313 are present in a region of the lower-side image data. Likewise, the communication data control circuit 115 determines whether the template region image data and the search region image data of a grid included in the lower side of the image data obtained through the upper/lower division are present in a region of the upper-side image data. In the example illustrated in FIG. 13, the communication data control circuit 115 determines that the hatched regions 1322 and 1324 of the template region image data 1302 and 1304 and the search region image data 1312 and 1314 are present in a region of the upper-side image data. In the case where the communication data control circuit 115 has determined that the template region image data or the search region image data is present in a region of the image data on the opposite side, the process moves to S1202. When such is not the case, the process moves to S1209.

In S1202, the communication data control circuit 115 determines bitA, which is a bit depth of the input image data, and bitB, which is a bit depth of the template region image data and the search region image data. As described earlier, bitA=14 bits and bitB=1 bit. In S1203, the communication data control circuit 115 determines sizeA, which is an image resolution of the input image data, and sizeB, which is an image resolution of the template region image data and the search region image data. As described earlier, the input image data is reduced by ½ by the reduction processing circuit 801, and the pixel number is calculated at the image size of the binary data. As such, sizeA=2 and sizeB=1.

In S1204, the communication data control circuit 115 calculates a pixel number pixnumA of the lines necessary when inputting and processing image data including template region image data and search region image data exceeding the boundary of the upper/lower division from the sensor correction circuit 201. Here, the number of pixels for the master-side image processor 100 is taken as PixnumA_M, and the number of pixels for the slave-side image processor 117 is taken as PixnumA_S. In the example illustrated in FIG. 13, this is the number of pixels in units of lines, from the division boundary, including the hatched regions 1321 and 1323. In other words, this is 42 pixels in the hatched region 1323 having the higher number of pixels in the vertical direction, and thus the number of pixels PixnumA_M for the master-side image processor 100 is 1920×42, or 80640, pixels. Likewise, PixnumA_S is the number of pixels in units of lines including the hatched regions 1322 and 1324. In other words, this is 38 pixels in the hatched region 1322 having the higher number of pixels in the vertical direction, and thus the number of pixels PixnumA_S for the slave-side image processor 117 is 1920× 38, or 72960, pixels.

Next, a number of pixels pixnumB of template region pixel data and search region pixel data is calculated. Here, the number of pixels for the master-side image processor 100 is taken as PixnumB_M, and the number of pixels for the slave-side image processor 117 is taken as PixnumB_S. In FIG. 13, the number of pixels in the template region image data and the search region image data for the hatched region 1321 (96 horizontal pixels and 32 vertical pixels) and the hatched region 1323 (96 horizontal pixels and 42 vertical pixels) is PixnumB_M. Accordingly, PixnumB_M is 96×32+48×8+96×42+48×18, or 8352, pixels. Likewise, the number of pixels in the template region image data and the search region image data for the hatched region 1322 (96 horizontal pixels and 38 vertical pixels) and the hatched region 1324 (96 horizontal pixels and 32 vertical pixels) is PixnumB_S. Accordingly, PixnumB_S is 96×38+48×10+ 96×32+48×16, or 7968, pixels.

In S1205, the communication data control circuit 115 calculates a processed data amount datasizeA of the lines necessary for the processing, and a processed data amount datasizeB of the template region image data and the search region image data. Specifically, the communication data control circuit 115 calculates datasizeA and datasizeB taking into account the bit depths, image resolutions, and numbers of pixels obtained in S1202 to 1204. Note that the processed data amounts of the master-side image processor 100 are taken as datasizeA_M and datasizeB_M, whereas the processed data amounts of the slave-side image processor 117 are taken as datasizeA_S and datasizeB_S.

In the example illustrated in FIG. 13, the processed data amounts of the master-side image processor 100 are:

datasizeA_M=bitA×sizeA^2×PixnumA_M=14×2 ^2×80640=4515840 (bits)

datasizeB_M=bitB×sizeB^2×PixnumB_M=1×1^2× 8352=8352 (bits)

On the other hand, the processed data amounts of the slave-side image processor 117 are:

datasizeA_S=bitA×sizeA^2×PixnumA_S=14×2^2× 72960=4085760 (bits)

datasizeB_S=bitB×sizeB^2×PixnumB_S=1×1^2× 7968=7968 (bits)

Accordingly, a processed data amount obtained by totaling these is datasizeA=datasizeA_M+datasizeA_S= 8601600 (bits), and datasizeB=datasizeB_M+datasizeB_ S=16320 (bits).

In S1206, the communication data control circuit 115 compares the processed data amounts calculated in S1205. In the case where datasizeA<datasizeB, or in other words, in the case where datasizeA is lower than datasizeB, the communication data control circuit 115 moves the processing to S1207. When such is not the case, the process moves to S1209. In the example illustrated in FIG. 13, the communication data control circuit 115 determines that this condition is not met, and moves the processing to S1209.

In S1207, of the input image data, the communication circuit 104 of the master-side image processor 100 transfers the image data of the lower half obtained from the upper/ lower division to the slave-side image processor 117 (in response to an instruction from the system control circuit 114). Furthermore, of the input image data, the image data of the line units including the template region image data and the search region image data in the image data of the upper half obtained from the upper/lower division is transferred to the slave-side image processor 117. In the example illustrated in FIG. 13, the 38 pixel lines including the hatched region 1322 and 540 pixel lines of the lower half image data are transferred to the slave-side image processor 117.

In S1208, the master-side image processor 100 or the slave-side image processor 117 uses an image processing module in the image processing circuit 102 to sequentially process half of the image data obtained through the upper/lower division, and the image data of the lines including the template region image data and the search region image data. In other words, the master-side image processor 100 sequentially processes the image data of the upper half obtained through the upper/lower division, and the image data of the lines including the template region image data and the search region image data. For example, the reduction processing circuit 801 processes output image data of the lines including VOUT_M=540 and VADD6_M=42 indicated in FIG. 14A, and the vector detection circuit 802 then processes this processed data. Meanwhile, the slave-side image processor 117 sequentially processes the image data of the lower half obtained through the upper/lower division, and the image data of the lines including the template region image data and the search region image data. The reduction processing circuit 801 processes image data of the lines including VOUT_S=540 and VADD6_S=38 indicated in FIG. 14B, and the vector detection circuit 802 then processes this processed data.

In S1209, the communication circuit 104 of the master-side image processor 100 transfers the template region image data and search region image data required by the vector detection circuit 802 of the slave-side image processor 117, to the slave-side image processor 117. Likewise, the communication circuit 104 of the slave-side image processor 117 transfers the template region image data and search region image data required by the vector detection circuit 802 of the master-side image processor 100, to the master-side image processor 100. In the example illustrated in FIG. 13, of the binary data processed by the vector detection circuit 802, the communication data control circuit 115 of the master-side image processor 100 transfers the image data of the hatched regions 1322 and 1324 to the slave-side image processor 117. On the other hand, of the binary data processed by the vector detection circuit 802, the communication data control circuit 115 of the slave-side image processor 117 transfers the image data of the hatched regions 1321 and 1323 to the master-side image processor 100.

In S1210, in the master-side image processor 100, the image data of the upper half obtained through the upper/lower division is sequentially processed by the blocks in the image processing circuit 102. For example, the reduction processing circuit 801 processes image data of the lines including VOUT_M=540 indicated in FIG. 14A, and the vector detection circuit 802 then processes this processed data. The vector detection circuit 802 uses the data transferred from the slave-side image processor 117 as the template region image data and the search region image data included in the image data of the lower half obtained through the upper/lower division (that is required for the vector detection process).

On the other hand, in the slave-side image processor 117, the image data of the lower half obtained through the upper/lower division is sequentially processed by the blocks in the image processing circuit 102. For example, the reduction processing circuit 801 processes image data of the lines including VOUT_S=540 indicated in FIG. 14B, and the vector detection circuit 802 then processes this processed data. The vector detection circuit 802 uses the data transferred from the master-side image processor 100 as the template region image data and the search region image data included in the image data of the upper half obtained through the upper/lower division (that is required for the vector detection process).

Upon the processing of S1208 or S1210 ending, the communication data control circuit 115 ends this series of operations. Note that the series of operations illustrated in FIG. 12 may be carried out every frame, or every several frames. Additionally, the operations may be applied in the case of playing back moving pictures in addition to when capturing moving pictures. Furthermore, in the case of playing back a moving picture, the processing up to S1205 may be executed in advance, for example, and the calculated data may be stored. Although the foregoing embodiments describe processing carried out among two image processors, the embodiments can also be applied in processing carried out among three or more image processors. Furthermore, although the foregoing embodiments describe a case where an image is divided into upper and lower parts as an example, the embodiments can also be applied in the case where the image is divided into left and right parts, three or more parts, and so on.

As described thus far, according to the present embodiment, the amount of data additionally required can be calculated for each frame by the vector detection circuit 802, and the transfer is carried out on a frame-by-frame basis in the case where the data amount is lower than in the case where the additional necessary data is obtained in line units. By doing so, the amount of image data to be processed by the blocks (of the image processing circuit 102) used in the former stages of the processing can be reduced, the amount of data transferred can be reduced, the time required for the overall processing can be shortened, and the amount of power consumed can be reduced.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-159681, filed Aug. 16, 2016, which is hereby incorporated by reference herein in its entirety.

What is claimed is:

1. An image processing apparatus comprising:
a first processing circuit which carries out image processing on a first image signal obtained from image signals forming a single image;
a second processing circuit which carries out the image processing on a second image signal obtained from the image signals forming the image; and
a control circuit which controls communication of image signals between the first processing circuit and the second processing circuit in accordance with progress of the image processing carried out by the first processing circuit and the second processing circuit,
wherein the first image signal and the second image signal are image signals obtained by dividing the image into regions such that the regions of the image do not overlap,
wherein the image processing includes first image processing and second image processing carried out in order,
wherein the control circuit controls the communication such that an image signal of a region of the image additionally required when the first processing circuit performs the second image processing is transferred from an image signal resulting from the second processing circuit carrying out the first image processing,
wherein the image signal of the region of the image additionally required is an image signal of a region within a predetermined range from a boundary along which the image has been divided into regions, not included in the image signal on which the first processing circuit carries out the image processing, and
wherein the control circuit determines, with respect to the image signal of the region of the image additionally required, whether a data amount of an image signal obtained for each region, among regions in frames necessary for carrying out the image processing, that passes the boundary is less than a data amount of an image signal obtained in a predetermined number of lines from the boundary.

2. The image processing apparatus according to claim 1, wherein the control circuit controls the communication such that the image signal of the region of the image additionally required is obtained and transferred in units of lines from the boundary.

3. The image processing apparatus according to claim 1, wherein the second image processing is processing for detecting a motion vector; and
wherein the control circuit controls the communication such that the image signal of the region of the image additionally required is obtained and transferred for each region, among regions in frames necessary for searching out the motion vector, that passes the boundary.

4. The image processing apparatus according to claim 1, wherein the control circuit controls the communication such that in the case where it has been determined that the data amount of the image signal obtained for each region that passes the boundary is less than the data amount of the image signal obtained in a predetermined number of lines from the boundary, the image signal obtained in each region that passes the boundary is obtained and transferred.

5. The image processing apparatus according to claim 1, wherein when determining the data amount, the control circuit takes into account a bit depth of an image signal obtained by image processing carried out by the second processing circuit.

6. The image processing apparatus according to claim 1, wherein when determining the data amount, the control circuit takes into account a resolution of an image signal obtained by image processing carried out by the second processing circuit.

7. The image processing apparatus according to claim 1, wherein the control circuit individually sets the region of the image transferred from the second processing circuit to the first processing circuit when the first processing circuit carries out the first image processing and the region of the image transferred from the second processing circuit to the first processing circuit when the first processing circuit carries out the second image processing.

8. The image processing apparatus according to claim 7, wherein the control circuit sets the region of the image transferred from the second processing circuit to the first processing circuit when the first processing circuit carries out the first image processing on the basis of the first image processing, and sets the region of the image transferred from the second processing circuit to the first processing circuit when the first processing circuit carries out the second image processing on the basis of the second image processing.

9. The image processing apparatus according to claim 1, wherein the control circuit causes the second processing circuit to reduce a data amount of the image signal of the region of the image additionally required when the first processing circuit carries out the image processing on the first image signal, and the image signal of the region of the image having the reduced data amount is transferred from the second processing circuit to the first processing circuit.

10. The image processing apparatus according to claim 9, wherein the first processing circuit reduces the data amount of the first image signal, and carries out the image processing using the first image signal having the reduced data amount and the image signal of the region of the image having the reduced data amount transferred by the control circuit.

11. The image processing apparatus according to claim 1, wherein the first processing circuit and the second processing circuit are mutually different image processors.

12. The image processing apparatus according to claim 11,
wherein the control circuit is implemented by one of the plurality of image processors.

13. A control method of an image processing apparatus comprising a first processing circuit, a second processing circuit, and a processor, the method comprising:
carrying out, by the first processing circuit, image processing on a first image signal obtained from image signals forming a single image;
carrying out, by the second processing circuit, the image processing on a second image signal obtained from the image signals forming the image; and controlling, by the processor, communication of image signals between the first processing circuit and the second processing circuit in accordance with progress of the image processing performed by the first processing circuit and the second processing circuit, wherein the first image signal and the second image signal are image signals obtained by dividing the image into regions such that the regions of the image do not overlap, wherein the image processing includes first image processing and second image processing carried out in order, wherein the communication is controlled such that an image signal of a region of the image additionally required when the first processing circuit performs the second image processing is transferred from an image signal resulting from the second processing circuit carrying out the first image processing, wherein the image signal of the region of the image additionally required is an image signal of a region within a predetermined range from a boundary along which the image has been divided into regions, not included in the image signal on which the first processing circuit carries out the image processing, and wherein the controlling includes determining, with respect to the image signal of the region of the image additionally required, whether a data amount of an image signal obtained for each region, among regions in frames necessary for carrying out the image processing, that passes the boundary is less than a data amount of an image signal obtained in a predetermined number of lines from the boundary.

14. A non-transitory computer-readable storage medium storing a computer program, for causing a computer to function as an image processing apparatus comprising a first processing circuit, a second processing circuit, and a processor, the computer program comprising:

a code to cause the first processing circuit to carry out image processing on a first image signal obtained from image signals forming a single image;

a code to cause the second processing circuit to carry out image processing on a second image signal obtained from the image signals forming the image; and a code to cause the processor to carry out control of communication of image signals between the first processing circuit and the second processing circuit in accordance with progress of the image processing performed by the first processing circuit and the second processing circuit, wherein the first image signal and the second image signal are image signals obtained by dividing the image into regions such that the regions of the image do not overlap, wherein the image processing includes first image processing and second image processing carried out in order, wherein the code to cause the processor to carry out control of communication controls the communication such that an image signal of a region of the image additionally required when the first processing circuit performs the second image processing is transferred from an image signal resulting from the second processing circuit carrying out the first image processing, wherein the image signal of the region of the image additionally required is an image signal of a region within a predetermined range from a boundary along which the image has been divided into regions, not included in the image signal on which the first processing circuit carries out the image processing, and wherein the code to cause the processor to carry out control of communication determines, with respect to the image signal of the region of the image additionally required, whether a data amount of an image signal obtained for each region, among regions in frames necessary for carrying out the image processing, that passes the boundary is less than a data amount of an image signal obtained in a predetermined number of lines from the boundary.

\* \* \* \* \*